United States Patent
Hayashi

(10) Patent No.: US 10,778,115 B2
(45) Date of Patent: Sep. 15, 2020

(54) CONTROL SYSTEM

(71) Applicant: TOSHIBA MITSUBISHI-ELECTRIC INDUSTRIAL SYSTEMS CORPORATION, Chuo-ku (JP)

(72) Inventor: Kenta Hayashi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 95 days.

(21) Appl. No.: 16/069,911

(22) PCT Filed: Jan. 15, 2016

(86) PCT No.: PCT/JP2016/051134
§ 371 (c)(1),
(2) Date: Jul. 13, 2018

(87) PCT Pub. No.: WO2017/122347
PCT Pub. Date: Jul. 20, 2017

(65) Prior Publication Data
US 2020/0059160 A1    Feb. 20, 2020

(51) Int. Cl.
*H02M 7/493*    (2007.01)
*H04L 12/437*   (2006.01)
*H02M 7/48*     (2007.01)

(52) U.S. Cl.
CPC .......... *H02M 7/493* (2013.01); *H04L 12/437* (2013.01); *H02M 2007/4822* (2013.01)

(58) Field of Classification Search
CPC .......... H02M 7/493; H02M 2007/4822; H04L 12/42; H04L 12/437
See application file for complete search history.

(56) References Cited

U.S. PATENT DOCUMENTS

| 4,771,423 A | 9/1988 | Ohya et al. |
| 8,854,848 B1 | 10/2014 | Chen et al. |

(Continued)

FOREIGN PATENT DOCUMENTS

| JP | 2006-340082 A | 12/2006 |
| WO | WO 2011/039865 A1 | 4/2011 |

OTHER PUBLICATIONS

International Search Report dated Mar. 29, 2016 in PCT/JP2016/051134 filed Jan. 15, 2016.

(Continued)

*Primary Examiner* — Fred E Finch, III
(74) *Attorney, Agent, or Firm* — Oblon, McClelland, Maier & Neustadt, L.L.P.

(57) ABSTRACT

In a power conversion system, if data communication between first to third control circuits is normal, then a ring-shaped first communication path is formed by the first to third control circuits and first communication lines of first to third communication cables, and a ring-shaped second communication path is formed by the first to third control circuits and second communication lines of the first to third communication cables. For example, if the data communication between the first and second control circuits is abnormal, a ring-shaped third communication path is formed by the first and second communication lines of the second and third communication cables and the first to third control circuits.

9 Claims, 11 Drawing Sheets

(56) References Cited

U.S. PATENT DOCUMENTS

| | | | |
|---|---|---|---|
| 2006/0116831 A1* | 6/2006 | Komulainen | H02M 7/493 |
| | | | 702/64 |
| 2009/0290393 A1* | 11/2009 | Angerer | H02M 7/493 |
| | | | 363/49 |
| 2011/0267854 A1* | 11/2011 | Flannery | H02M 7/493 |
| | | | 363/72 |
| 2012/0218790 A1 | 8/2012 | Sato et al. | |
| 2013/0279222 A1* | 10/2013 | Cai | H02M 5/4585 |
| | | | 363/78 |
| 2016/0247641 A1* | 8/2016 | Malapelle | H02M 1/32 |

OTHER PUBLICATIONS

Office Action dated Jul. 2, 2020 in Indian Application No. 201817029573.
Office Action dated Jun. 22, 2020 in Chinese Application No. 201680078946.7.

* cited by examiner

CONTROL SYSTEM

TECHNICAL FIELD

The present invention relates to a control system, and more particularly to a control system including a plurality of control circuits each of which controls a corresponding one of a plurality of electrical apparatuses.

BACKGROUND ART

WO 2011/039865 (PTD 1) discloses a power conversion system including m power converters connected in parallel to a load, and communication lines connected to the m power converters, where m denotes an integer greater than or equal to 2. Each power converter includes an inverter that converts DC power into AC power to supply the AC power to the load, a current sensor that detects a load current value, a communication circuit that transmits the load current value detected by the current sensor to each of the other (m−1) power converters through a corresponding communication line and receives (m−1) load current values transmitted from the other (m−1) power converters through the communication lines, an arithmetic circuit that calculates a sharing current and a cross current of a corresponding power converter based on the load current value detected by a corresponding current sensor and based on the (m−1) load current values received by the communication circuit, and a control circuit that controls the inverter so that the sharing current is supplied from a corresponding power converter to the load and so that there is no cross current.

Japanese Patent Laying-Open No. 2006-340082 (PTD 2) discloses a serial-signal transferring method to transfer a serial signal where a combination of the exclusive OR of each data bit signal constituting a data signal to be transferred and a modulation signal with the modulation signal is a high-order bit signal, and where a combination of the exclusive OR of the data bit signal and an inversion signal of the modulation signal with the inversion signal of the modulation signal is a low-order bit signal. In PTD 2, on the receiving apparatus side, if the sum of data bit signals corresponding to the high-order bit signal and the low-order bit signal of the serial signal is not a predetermined logical value, the data bit signal is determined to be abnormal and the use of the signal is stopped.

CITATION LIST

Patent Document

PTD 1: WO 2011/039865
PTD 2: Japanese Patent Laying-Open No. 2006-340082

SUMMARY OF INVENTION

Technical Problem

In PTD 1, however, each power converter receives load current values from the other (m−1) power converters and calculates a sharing current and a cross current, and thus the data communication traffic is disadvantageously heavy, leading to a slow communication rate.

In PTD 2, the use of a data bit signal is stopped if it is determined to be abnormal. Accordingly, control of an object needs to be stopped if an abnormality occurs in a data bit signal.

Thus, a main object of the present invention is to provide a control system that allows for light data communication traffic and a high communication rate, and that can control a plurality of electrical apparatuses even if an abnormality occurs in communication of data signal.

Solution to Problem

A control system according to the present invention includes: first to Nth control circuits configured to control first to Nth electrical apparatuses, respectively; and first to Nth communication cables each including first and second communication lines, where N is an integer greater than or equal to 2. The first to (N−1)th control circuits are connected to the second to Nth control circuits in respective subsequent stages through the first to (N−1)th communication cables, respectively, and the Nth control circuit is connected to the first control circuit in a subsequent stage through the Nth communication cable. The first control circuit is configured to generate a first data signal for controlling the first to Nth electrical apparatuses, control the first electrical apparatus based on the first data signal, transmit the first data signal to the second control circuit in a subsequent stage through the first communication line of the first communication cable, and transmit the first data signal to the Nth control circuit in a preceding stage through the second communication line of the Nth communication cable. The control circuit in a preceding stage of the nth control circuit is the (n−1)th control circuit, and the control circuit in a subsequent stage of the nth control circuit is the (n+1)th control circuit or the first control circuit, where n is an integer greater than or equal to 2 and less than or equal to N. The nth control circuit is configured to control the nth electrical apparatus based on the first data signal and generate an nth data signal representing a result of control of the nth electrical apparatus. The nth control circuit is configured to, if communication of data signal with each of the control circuits in a preceding stage and in a subsequent stage is normally performed, transmit the nth data signal and a data signal from the control circuit in a preceding stage to the control circuit in a subsequent stage through the first communication line of the nth communication cable, and transmit the nth data signal and a data signal from the control circuit in a subsequent stage to the control circuit in a preceding stage through the second communication line of the (n−1)th communication cable. The nth control circuit is configured to, if communication of data signal with the control circuit in a preceding stage is not normally performed, stop communication of data signal with the control circuit in a preceding stage, and transmit the nth data signal and a data signal from the control circuit in a subsequent stage to the control circuit in a subsequent stage through the first communication line of the nth communication cable. The nth control circuit is configured to, if communication of data signal with the control circuit in a subsequent stage is not normally performed, stop communication of data signal with the control circuit in a subsequent stage, and transmit the nth data signal and a data signal from the control circuit in a preceding stage to the control circuit in a preceding stage through the second communication line of the (n−1)th communication cable.

Advantageous Effects of Invention

In a control system according to the present invention, first to Nth control circuits are connected by first to Nth communication cables to form a ring, with the first control circuit being a master, and with each of the second to Nth control circuits being a slave. Therefore, reduction in data communication traffic and increase in communication rate can be achieved.

Further, if data communication is normally performed between an nth control circuit and the control circuit in a preceding stage thereof and between the nth control circuit and the control circuit in a subsequent stage thereof, then a ring-shaped first communication path is formed by the first to Nth control circuits and the first communication lines of the first to Nth communication cables, and a ring-shaped second communication path is formed by the first to Nth control circuits and the second communication lines of the first to Nth communication cables. If data communication is not normally performed between an nth control circuit and the control circuit in a preceding stage thereof, a ring-shaped third communication path is formed by the first and second communication lines of (N−1) communication cables other than the (n−1)th communication cable and by the first to Nth control circuits. If data communication is not normally performed between an nth control circuit and the control circuit in a subsequent stage thereof, a ring-shaped fourth communication path is formed by the first and second communication lines of (N−1) communication cables other than the nth communication cable and by the first to Nth control circuits. Therefore, the first to Nth electrical apparatuses can be controlled even if an abnormality occurs in data communication between two control circuits.

DESCRIPTION OF EMBODIMENTS

Figure 1:
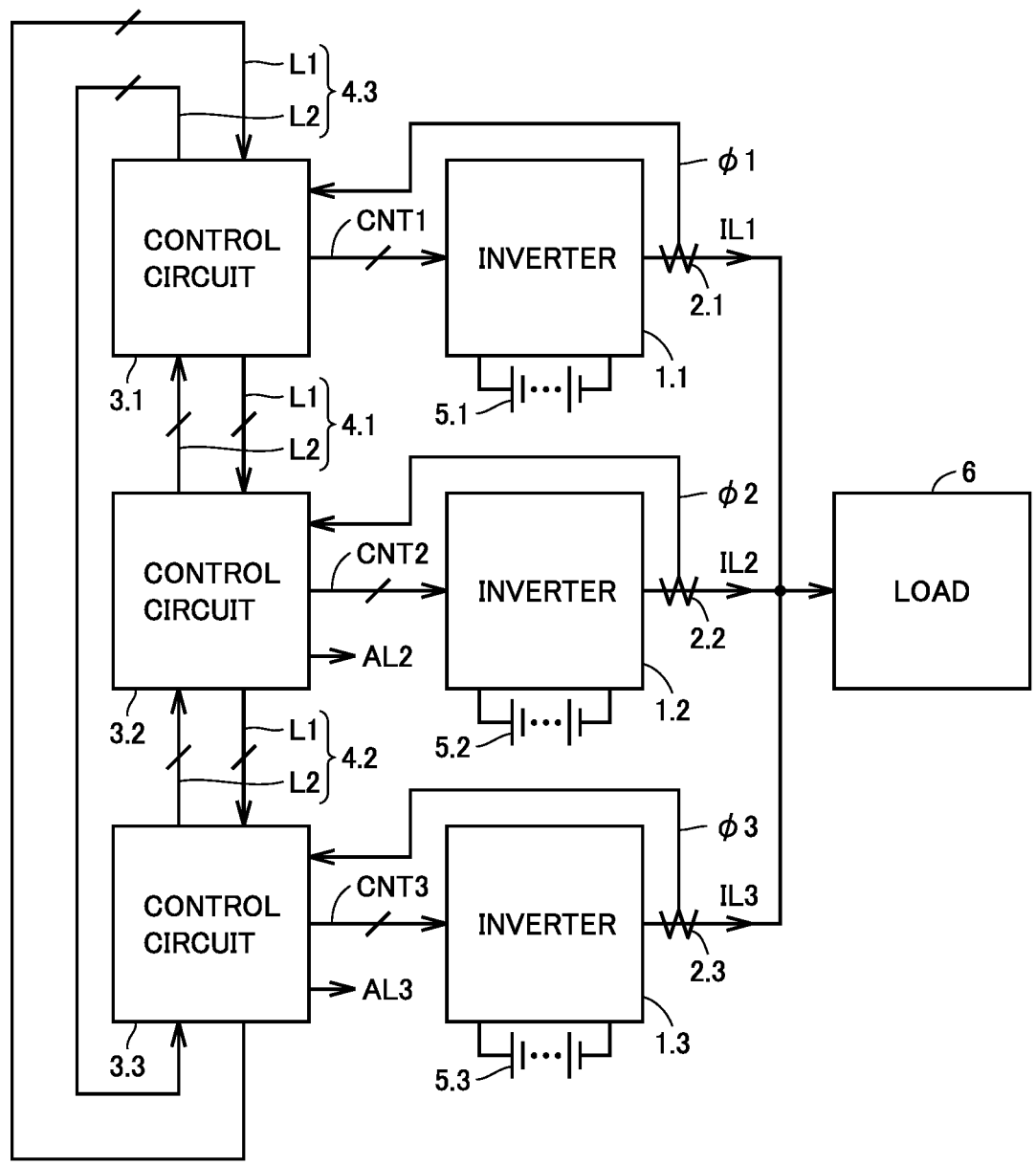
FIG. 1 is a circuit block diagram showing a configuration of a power conversion system according to one embodiment of the present invention.

FIG. 1 is a circuit block diagram showing a configuration of a power conversion system according to one embodiment of the present invention. In FIG. 1, the power conversion system includes a plurality of (three in FIG. 1) inverters 1.1-1.3, a plurality of (three in this case) current detectors 2.1-2.3, a plurality of (three in this case) control circuits 3.1-3.3, a plurality of (three in this case) communication cables 4.1-4.3. Each of inverters 1.1-1.3 constitutes an electrical apparatus, and control circuits 3.1-3.3 and communication cables 4.1-4.3 constitute a control system.

Inverters 1.1-1.3 operate based on control signals CNT1-CNT3 from control circuits 3.1-3.3, respectively, and convert respective DC voltages supplied from DC power sources 5.1-5.3, respectively, into respective AC voltages having a certain frequency (e.g. commercial frequency). Output voltages of inverters 1.1-1.3 are applied to a load 6 in parallel. Each of DC power sources 5.1-5.3 may be a battery, a capacitor, or a converter that converts AC power into DC power.

Current detectors 2.1-2.3 detect respective instantaneous values of currents IL1-IL3 respectively flowing from inverters 1.1-1.3 to load 6, and respectively output signals $\varphi 1$-$\varphi 3$ representing the respective detection values. Signals $\varphi 1$-$\varphi 3$ are supplied to control circuits 3.1-3.3, respectively.

Control circuit 3.1 is connected to control circuit 3.2 in a subsequent stage through communication cable 4.1, control circuit 3.2 is connected to control circuit 3.3 in a subsequent stage through communication cable 4.2, and control circuit 3.3 is connected to control circuit 3.1 in a subsequent stage through communication cable 4.3. The preceding stage of control circuit 3.1 is control circuit 3.3, and the subsequent stage of control circuit 3.1 is control circuit 3.2. The preceding stage of control circuit 3.2 is control circuit 3.1, and the subsequent stage of control circuit 3.2 is control circuit 3.3. The preceding stage of control circuit 3.3 is control circuit 3.2, and the subsequent stage of control circuit 3.3 is control circuit 3.1. Control circuits 3.1-3.3 are connected by communication cables 4.1-4.3 to form a ring and exchange data signals with one another through communication cables 4.1-4.3. Control circuit 3.1 is a master, and each of control circuits 3.2, 3.3 is a slave.

Control circuit 3.1 calculates IL1+IL2+IL3, which is a total sum value of load current value IL1 represented by output signal $\varphi 1$ of current detector 2.1, and load current values IL2, IL3 represented by data signals D2, D3 from control circuits 3.2, 3.3, respectively. Control circuit 3.1 then calculates sharing current IS=(IL1+IL2+IL3)/3 by dividing the total sum value by the number of inverters 1.1-1.3 (i.e., 3).

Control circuit 3.1 calculates cross current IC1=IL1−IS by subtracting sharing current IS from load current value ILL generates control signal CNT1 so that the calculated cross current IC1 is 0 A, and controls inverter 1.1. For example, control circuit 3.1 gradually decreases the output voltage value of inverter 1.1 if cross current IC1 is a positive value, whereas control circuit 3.1 gradually increases the output voltage value of inverter 1.1 if cross current IC1 is a negative value. Alternatively, control circuit 3.1 gradually retards the phase of the output voltage of inverter 1.1 if cross current IC1 is a positive value, whereas control circuit 3.1 gradually advances the phase of the output voltage of inverter 1.1 if cross current IC1 is a negative value.

Control circuit 3.1 transmits a data signal D1 to control circuits 3.2, 3.3, data signal D1 representing the calculated sharing current IS. Data signal D1 is a signal to control inverters 1.1-1.3.

Control circuit 3.2 calculates cross current IC2=IL2−IS by subtracting sharing current IS represented by data signal D1 from control circuit 3.1, from load current value IL2 detected by current detector 2.2. Control circuit 3.2 then generates control signal CNT2 so that the calculated cross current IC2 is 0 A, and controls inverter 1.2.

Control circuit 3.2 transmits data signal D2 to control circuit 3.1, data signal D2 representing load current value IL2 detected by current detector 2.2. Data signal D2 is a signal representing the result of control of inverter 1.2. If an abnormality occurs in communication of data signal, control circuit 3.2 outputs an alarm signal AL2 notifying the abnormality. There may be, for example, a light source, a sound source, and/or a display provided to notify an abnormality occurring in communication of data signal through, for example, light, sound, and/or images in response to alarm signal AL2.

Control circuit 3.3 calculates cross current IC3=IL3−IS by subtracting sharing current IS represented by data signal D1 from control circuit 3.1, from load current value IL3 detected by current detector 2.3. Control circuit 3.3 then generates control signal CNT3 so that the calculated cross current IC3 is 0 A, and controls inverter 1.3.

Control circuit 3.3 transmits data signal D3 to control circuit 3.1, data signal D3 representing load current value IL3 detected by current detector 2.3. Data signal D3 is a signal representing the result of control of inverter 1.3. If an abnormality occurs in communication of data signal, control circuit 3.3 outputs an alarm signal AL3 notifying the abnormality. There may be, for example, a light source, a sound source, and/or a display provided to notify an abnormality occurring in communication of data signal through, for example, light, sound, and/or images in response to alarm signal AL3.

Communication cable 4.1 is connected between control circuits 3.1, 3.2. Communication cable 4.1 includes a communication line L1 for carrying a data signal from control circuit 3.1 in a preceding stage to control circuit 3.2 in a subsequent stage, and a communication line L2 for carrying a data signal from control circuit 3.2 in a subsequent stage to control circuit 3.1 in a preceding stage.

Communication cable 4.2 is connected between control circuits 3.2, 3.3. Communication cable 4.2 includes communication line L1 for carrying a data signal from control circuit 3.2 in a preceding stage to control circuit 3.3 in a subsequent stage, and communication line L2 for carrying a data signal from control circuit 3.3 in a subsequent stage to control circuit 3.2 in a preceding stage.

Communication cable 4.3 is connected between control circuits 3.3, 3.1. Communication cable 4.3 includes communication line L1 for carrying a data signal from control circuit 3.3 in a preceding stage to control circuit 3.1 in a subsequent stage, and communication line L2 for carrying a data signal from control circuit 3.1 in a subsequent stage to control circuit 3.3 in a preceding stage.

Communication cable 4.1 is a multicore cable. Each of communication lines L1-L3 includes a plurality of signal lines. Communication cable 4.1 has one end and the other end each having a connector (not shown). Each of communication cables 4.2, 4.3 is the same as communication cable 4.1 in configuration. The connector at one end of communication cable 4.1 is connected to a connector of control circuit 3.1, and the connector at the other end of communication cable 4.1 is connected to a connector of control circuit 3.2. The connector at one end of communication cable 4.2 is connected to a connector of control circuit 3.2, and the connector at the other end of communication cable 4.2 is connected to a connector of control circuit 3.3. The connector at one end of communication cable 4.3 is connected to a connector of control circuit 3.3, and the connector at the other end of communication cable 4.3 is connected to a connector of control circuit 3.1.

If communication of data signal is normally performed between control circuits 3.1 and 3.2, between control circuits 3.2 and 3.3, and between control circuits 3.3 and 3.1, then control circuits 3.1-3.3 and communication lines L1 of communication cables 4.1-4.3 form a ring-shaped first communication path, and control circuits 3.1-3.3 and communication lines L2 of communication cables 4.1-4.3 form a ring-shaped second communication path.

In the first communication path, data signal D1 is transmitted from control circuit 3.1 to control circuit 3.2 through communication line L1 of communication cable 4.1, data signals D1, D2 are transmitted from control circuit 3.2 to control circuit 3.3 through communication line L1 of communication cable 4.2, and data signals D1-D3 are transmitted from control circuit 3.3 to control circuit 3.1 through communication line L1 of communication cable 4.3.

In the second communication path, data signal D1 is transmitted from control circuit 3.1 to control circuit 3.3 through communication line L2 of communication cable 4.3, data signals D1, D3 are transmitted from control circuit 3.3 to control circuit 3.2 through communication line L2 of communication cable 4.2, and data signals D1-D3 are transmitted from control circuit 3.2 to control circuit 3.1 through communication line L2 of communication cable 4.1.

When communication of data signal is not normally performed between control circuit 3.1 and control circuit 3.2, a ring-shaped third communication path is formed by control circuits 3.1-3.3 and communication cables 4.2, 4.3.

In the third communication path, data signal D1 is transmitted from control circuit 3.1 to control circuit 3.3 through communication line L2 of communication cable 4.3, data signals D1, D3 are transmitted from control circuit 3.3 to control circuit 3.2 through communication line L2 of communication cable 4.2, data signals D1-D3 are transmitted from control circuit 3.2 to control circuit 3.3 through communication line L1 of communication cable 4.2, and data signals D1-D3 are transmitted from control circuit 3.3 to control circuit 3.1 through communication line L1 of communication cable 4.3.

When data signal is not normally carried between control circuit 3.2 and control circuit 3.3, a ring-shaped fourth communication path is formed by control circuits 3.1-3.3 and communication cables 4.1, 4.3.

In the fourth communication path, data signal D1 is transmitted from control circuit 3.1 to control circuit 3.3 through communication line L2 of communication cable 4.3, data signals D1, D3 are transmitted from control circuit 3.3 to control circuit 3.1 through communication line L1 of communication cable 4.3, data signals D1, D3 are transmitted from control circuit 3.1 to control circuit 3.2 through communication line L1 of communication cable 4.1, and data signals D1-D3 are transmitted from control circuit 3.2 to control circuit 3.1 through communication line L2 of communication cable 4.1.

When data signal is not normally carried between control circuit 3.3 and control circuit 3.1, a ring-shaped fifth communication path is formed by control circuits 3.1-3.3 and communication cables 4.1, 4.2.

In the fifth communication path, data signal D1 is transmitted from control circuit 3.1 to control circuit 3.2 through communication line L1 of communication cable 4.1, data signals D1, D2 are transmitted from control circuit 3.2 to control circuit 3.3 through communication line L1 of communication cable 4.2, data signals D1-D3 are transmitted from control circuit 3.3 to control circuit 3.2 through communication line L2 of communication cable 4.2, and data signals D1-D3 are transmitted from control circuit 3.2 to control circuit 3.1 through communication line L2 of communication cable 4.1.

Figure 2:
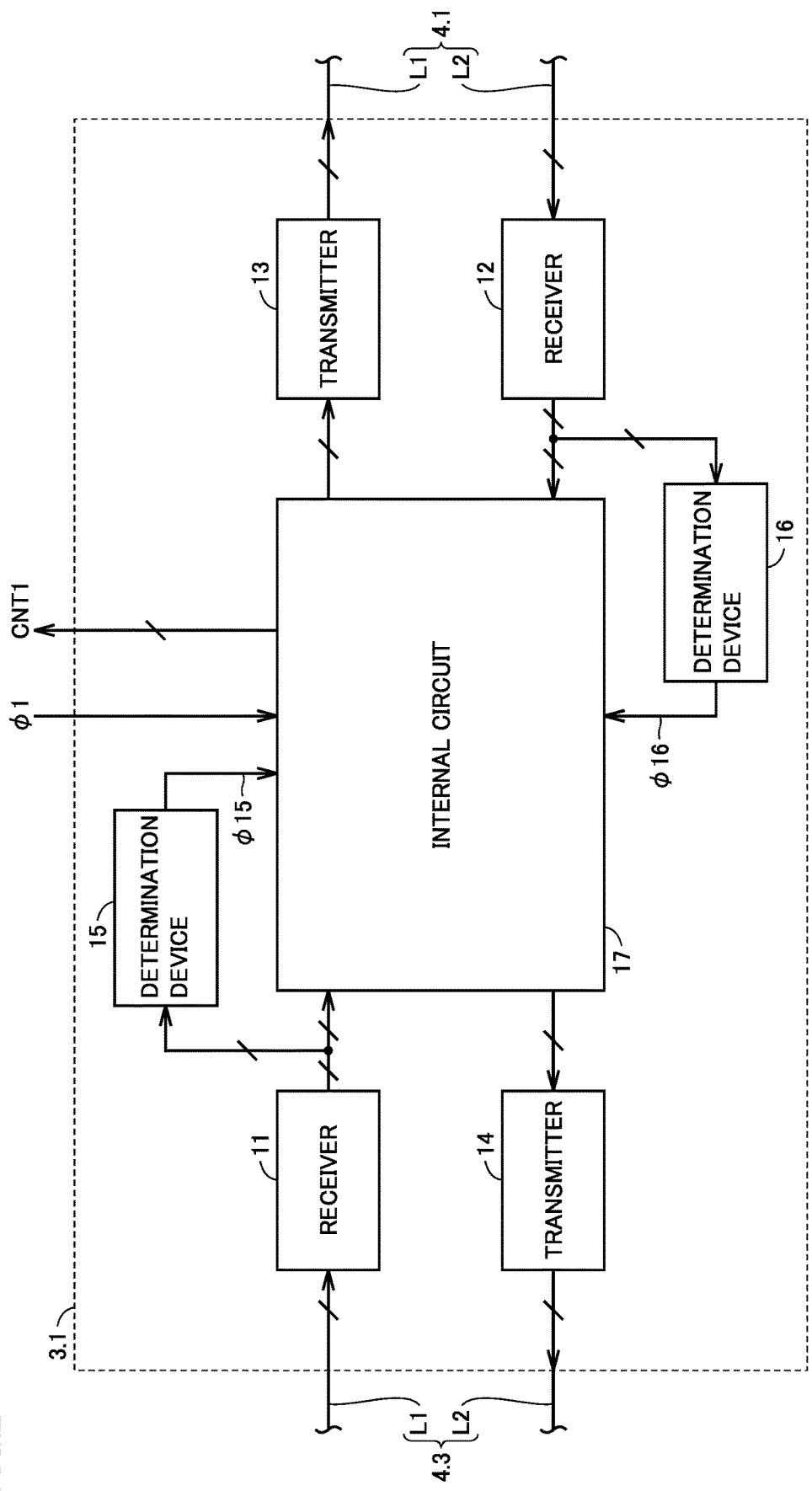
FIG. 2 is a block diagram showing a configuration of a control circuit 3.1 shown in FIG. 1.

FIG. 2 is a block diagram showing a configuration of control circuit 3.1. In FIG. 2, control circuit 3.1 includes receivers 11, 12, transmitters 13, 14, determination devices 15, 16, and an internal circuit 17.

Receiver 11 receives data signals D1-D3 transmitted from control circuit 3.3 through communication line L1 of communication cable 4.3, and supplies the received data signals D1-D3 to determination device 15 and internal circuit 17. Determination device 15 determines whether or not data signals D1-D3 from receiver 11 are normal. If the data signals D1-D3 are normal, determination device 15 sets a signal $\varphi15$ to the "L" level; whereas if the data signals D1-D3 are abnormal, determination device 15 sets signal $\varphi15$ to the "H" level. Signal $\varphi15$ is supplied to internal circuit 17.

Receiver 12 receives data signals D1-D3 transmitted from control circuit 3.2 through communication line L2 of communication cable 4.1, and supplies the received data signals D1-D3 to determination device 16 and internal circuit 17. Determination device 16 determines whether or not data signals D1-D3 from receiver 12 are normal. If the data signals D1-D3 are normal, determination device 16 sets a signal $\varphi16$ to the "L" level; whereas if the data signals D1-D3 are abnormal, determination device 16 sets signal $\varphi16$ to the "H" level. Signal $\varphi16$ is supplied to internal circuit 17.

The determination of whether or not data signals D1-D3 are normal in determination devices 15, 16 is performed using, for example, a parity check system. In the parity check system, a bit string constituting a data signal is separated into certain units, and a parity bit is added to each unit, the parity bit representing whether the number of bits having a value "1" included in each unit is an odd number or an even number. On the receiving side, the number of "1" is compared with a parity bit for each unit and it is determined whether any error has been occurred during data transfer. Further, it may also be determined whether or not the data size is normal, and the method described in Japanese Patent Laying-Open No. 2006-340082 (PTD 2) may be used.

If determination devices 15, 16 determine data signals D1-D3 to be normal to set signals $\varphi15$, $\varphi16$ both to the "L" level, and data signals D2, D3 from receiver 11 and data signals D2, D3 from receiver 12 match each other, then internal circuit 17 generates new data signal D1 (i.e., sharing current value IS) for controlling inverters 1.1-1.3, based on the received data signals D2, D3 (i.e., load current values IL2, IL3) and based on output signal $\varphi1$ (i.e., load current value IL1) of current detector 2.1. In the case where data communication has been normally performed as in this case, internal circuit 17 stores the latest data signals D2, D3 that have been used for generating data signal D1.

If determination devices 15, 16 determine data signals D1-D3 to be normal, and data signals D1-D3 from receiver 11 and data signals D1-D3 from receiver 12 do not match each other, then internal circuit 17 generates new data signal D1 (i.e., sharing current value IS) for controlling inverters 1.1-1.3, based on the latest data signals D2, D3 (i.e., load current values IL2, IL3) that were used and stored when data communication was normally performed and based on output signal $\varphi1$ (i.e., load current value IL1) of current detector 2.1.

If determination device 15 determines data signals D1-D3 from receiver 11 to be normal to set signal $\varphi15$ to the "L" level, and determination device 16 determines data signals D1-D3 from receiver 12 to be abnormal to set signal $\varphi16$ to the "H" level, then internal circuit 17 generates new data signal D1 (i.e., sharing current value IS) for controlling inverters 1.1-1.3, based on data signals D2, D3 (i.e., load current values IL2, IL3) from receiver 11 and based on output signal $\varphi1$ (i.e., load current value IL1) from current detector 2.1.

If determination device 15 determines data signals D1-D3 from receiver 11 to be abnormal to set signal $\varphi15$ to the "H" level, and determination device 16 determines data signals D1-D3 from receiver 12 to be normal to set signal $\varphi16$ to the "L" level, then internal circuit 17 generates new data signal D1 (i.e., sharing current value IS) for controlling inverters 1.1-1.3, based on data signals D2, D3 (i.e., load current values IL2, IL3) from receiver 12 and based on output signal $\varphi1$ (i.e., load current value IL1) of current detector 2.1.

If determination devices 15, 16 determine data signals D1-D3 to be abnormal, then internal circuit 17 generates new data signal D1 (i.e., sharing current value IS) for controlling inverters 1.1-1.3, based on the latest data signals D2, D3 (i.e., load current values IL2, IL3) that were used and stored when data communication was normally performed and based on output signal $\varphi1$ (i.e., load current value IL1) of current detector 2.1.

Internal circuit 17 calculates cross current IC=IL1−IS based on the generated new data signal D1 (i.e., sharing current value IS) and based on output signal $\varphi1$ (i.e., load current value IL1) of current detector 2.1, generates control signal CNT1 so that the cross current IC is 0 A, and controls inverter 1.1.

Transmitter 13 transmits new data signal D1 generated by internal circuit 17 to control circuit 3.2 through communication line L1 of communication cable 4.1. Transmitter 14 transmits new data signal D1 generated by internal circuit 17 to control circuit 3.3 through communication line L2 of communication cable 4.3.

Figure 3:
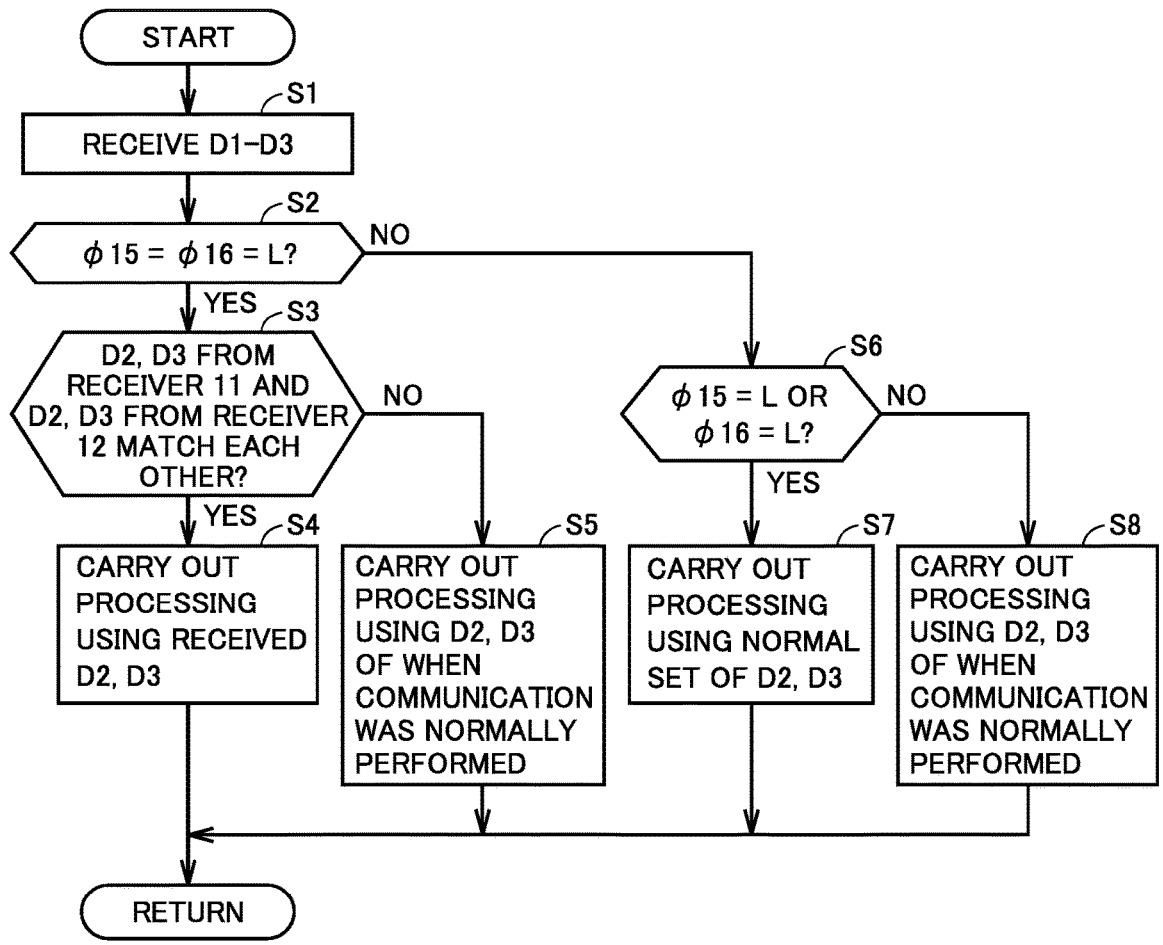
FIG. 3 is a flowchart showing an operation of an internal circuit shown in FIG. 2.

FIG. 3 is a flowchart showing an operation of internal circuit 17. At step S1, internal circuit 17 receives data signals D1-D3 through receivers 11, 12. At step S2, internal circuit 17 determines whether or not output signals $\varphi15$, $\varphi16$ of determination devices 15, 16 are both at the "L" level.

If signals $\varphi15$, $\varphi16$ are both at the "L" level at step S2, internal circuit 17 determines whether or not data signals D2, D3 from receiver 11 and data signals D2, D3 from receiver 12 match each other at step S3.

If it is determined at step S3 that data signals D2, D3 from receiver 11 and data signals D2, D3 from receiver 12 match each other, internal circuit 17 carries out processing, at step S4, using data signals D2, D3 from receivers 11, 12. That is, internal circuit 17 generates new data signal D1 based on the received data signals D2, D3 and based on output signal $\varphi1$ of current detector 2.1, transmits new data signal D1 to control circuits 3.2, 3.3, stores the latest data signals D2, D3 that have been used for generating data signal D1, controls inverter 1.1 using new data signal D1, and returns to step S1.

If it is determined at step S3 that data signals D2, D3 from receiver 11 and data signals D2, D3 from receiver 12 do not match each other, internal circuit 17 carries out processing, at step S5, using the latest data signals D2, D3 that were used and stored when data communication was normally performed. That is, internal circuit 17 generates new data signal D1 based on the latest data signals D2, D3 that were used and stored when data communication was normally performed and based on output signal $\varphi1$ of current detector 2.1, transmits new data signal D1 to control circuits 3.2, 3.3, controls inverter 1.1 using new data signal D1, and returns to step S1.

If the condition where signals $\varphi15$, $\varphi16$ are both at the "L" level is denied at step S2, then internal circuit 17 determines at step S6 whether or not signal $\varphi15$ or signal $\varphi16$ is at the "L" level.

If signal φ15 or signal φ16 is determined to be at the "L" level at step S6, internal circuit 17 carries out processing, at step S7, using data signals D2, D3 included in a normal set of data signals D1-D3 out of the sets of data signals D1-D3 from receivers 11, 12. That is, internal circuit 17 generates new data signal D1 based on a normal set of data signals D2, D3 and based on output signal φ1 of current detector 2.1, transmits new data signal D1 to control circuits 3.2, 3.3, controls inverter 1.1 using new data signal D1, and returns to step S1.

If the condition where signal φ15 or signal φ16 is at the "L" level is denied at step S6, then internal circuit 17 carries out processing, at step S8, using the latest data signals D2, D3 that were used and stored when data communication was normally performed. That is, internal circuit 17 generates new data signal D1 based on the latest data signals D2, D3 that were used and stored when data communication was normally performed and based on output signal φ1 of current detector 2.1, transmits new data signal D1 to control circuits 3.2, 3.3, controls inverter 1.1 using new data signal D1, and returns to step S1.

Figure 4:
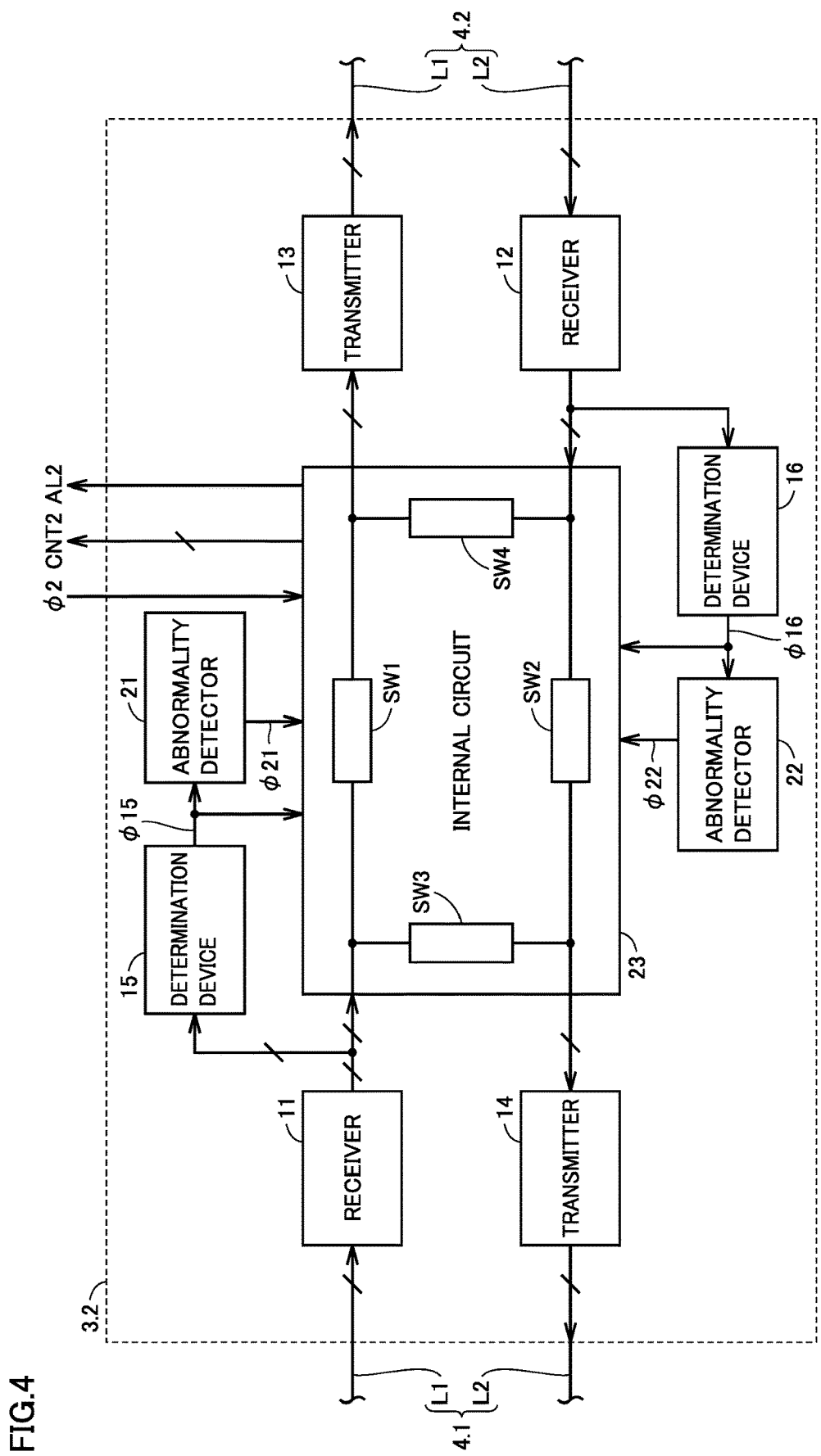
FIG. 4 is a block diagram showing a configuration of a control circuit 3.2 shown in FIG. 1.

FIG. 4 is a block diagram showing a configuration of control circuit 3.2, FIG. 4 being contrasted with FIG. 2. With reference to FIG. 4, control circuit 3.2 is different from control circuit 3.1 in that the former additionally includes abnormality detectors 21, 22 and includes an internal circuit 23 instead of internal circuit 17.

Receiver 11 receives data signal D1 transmitted from control circuit 3.1 through communication line L1 of communication cable 4.1, and supplies the received data signal D1 to determination device 15 and internal circuit 23. Determination device 15 determines whether or not data signal D1 from receiver 11 is normal. If the data signal D1 is normal, determination device 15 sets signal φ15 to the "L" level; whereas if the data signal D1 is abnormal, determination device 15 sets signal φ15 to the "H" level. Signal φ15 is supplied to internal circuit 23.

Receiver 12 receives data signals D1, D3 transmitted from control circuit 3.3 through communication line L2 of communication cable 4.2, and supplies the received data signals D1, D3 to determination device 16 and internal circuit 23. Determination device 16 determines whether or not data signals D1, D3 from receiver 12 are normal. If the data signals D1, D3 are normal, determination device 16 sets signal φ16 to the "L" level; whereas if the data signals D1, D3 are abnormal, determination device 16 sets signal φ16 to the "H" level. Signal φ16 is supplied to internal circuit 23.

If output signal φ15 of determination device 15 is set to the "H" level three times (predetermined number of times) consecutively, abnormality detector 21 raises abnormality detection signal φ21 from the "L" level (inactivation level) to the "H" level (activation level). If output signal φ16 of determination device 16 is set to the "H" level three times (predetermined number of times) consecutively, abnormality detector 22 raises abnormality detection signal φ22 from the "L" level (inactivation level) to the "H" level (activation level).

If determination devices 15, 16 determine data signal D1 and data signals D1, D3 to be normal to set signals φ15, φ16 both to the "L" level, and data signal D1 from receiver 11 and data signal D1 from receiver 12 match each other, then internal circuit 23 calculates cross current IC2 based on the data signal D1 (i.e., sharing current value IS) and based on output signal φ2 (i.e., load current value IL2) of current detector 2.2, generates control signal CNT2 so that the cross current IC2 is 0 A, and controls inverter 1.2. Further, internal circuit 23 generates data signal D2 (i.e., load current value IL2) based on output signal φ2 of current detector 2.2. In the case where data communication has been normally performed as in this case, internal circuit 23 stores the latest data signal D1 that has been used for controlling inverter 1.2.

If determination devices 15, 16 determine data signal D1 and data signals D1, D3 to be normal, and data signal D1 from receiver 11 and data signal D1 from receiver 12 do not match each other, then internal circuit 23 calculates cross current IC2 based on the latest data signal D1 (i.e., sharing current value IS) that was used and stored when data communication was normally performed and based on output signal φ2 (i.e., load current value IL2) of current detector 2.2, generates control signal CNT2 so that the cross current IC2 is 0 A, and controls inverter 1.2. Further, internal circuit 23 generates data signal D2 (i.e., load current value IL2) based on output signal φ2 of current detector 2.2.

If determination device 15 determines data signal D1 from receiver 11 to be normal to set signal φ15 to the "L" level, and determination device 16 determines data signals D1, D3 from receiver 12 to be abnormal to set signal φ16 to the "H" level, then internal circuit 23 calculates cross current IC2 based on data signal D1 (i.e., sharing current value IS) from receiver 11 and based on output signal φ2 (i.e., load current value IL2) of current detector 2.2, generates control signal CNT2 so that the cross current IC2 is 0 A, and controls inverter 1.2. Further, internal circuit 23 generates data signal D2 (i.e., load current value IL2) based on output signal φ2 of current detector 2.2.

If determination device 15 determines data signal D1 from receiver 11 to be abnormal to set signal φ15 to the "H" level, and determination device 16 determines data signals D1, D3 from receiver 12 to be normal to set signal φ16 to the "L" level, then internal circuit 23 calculates cross current IC2 based on data signal D1 (i.e., sharing current value IS) from receiver 12 and based on output signal φ2 (i.e., load current value IL2) of current detector 2.2, generates control signal CNT2 so that the cross current IC2 is 0 A, and controls inverter 1.2. Further, internal circuit 23 generates data signal D2 (i.e., load current value IL2) based on output signal φ2 of current detector 2.2.

If determination devices 15, 16 both determine data signals D1 to be abnormal, then internal circuit 23 calculates cross current IC2 based on the latest data signal D1 (i.e., sharing current IS) that was used and stored when data communication was normally performed and based on output signal φ2 (i.e., load current value IL2) of current detector 2.2, generates control signal CNT2 so that the cross current IC2 is 0 A, and controls inverter 1.2. Further, internal circuit 23 generates data signal D2 (i.e., load current value IL2) based on output signal φ2 of current detector 2.2.

Further, internal circuit 23 includes switches SW1-SW4. Switch SW1 is connected between receiver 11 and transmitter 13. Switch SW2 is connected between receiver 12 and transmitter 14. Switch SW3 is connected between receiver 11 and transmitter 14. Switch SW4 is connected between receiver 12 and transmitter 13.

If abnormality detection signals φ21, φ22 are both at the "L" level (inactivation level), then switches SW1, SW2 are turned on and switches SW3, SW4 are turned off Internal circuit 23 supplies data signal D1 from receiver 11 and new data signal D2 to transmitter 13 through switch SW1, and supplies data signals D1, D3 from receiver 12 and new data signal D2 to transmitter 14 through switch SW2. Transmitter 13 transmits data signals D1, D2 from internal circuit 23 to control circuit 3.3 through communication line L1 of communication cable 4.2. Transmitter 14 transmits data signals D1-D3 from internal circuit 23 to control circuit 3.1 through communication line L2 of communication cable 4.1.

If abnormality detection signals φ21, φ22 get to the "H" level and the "L" level, respectively, then switch SW4 is turned on and switches SW1-SW3 are turned off. Internal circuit 23 stops receiving data signal D1 from receiver 11 and supplies data signals D1, D3 from receiver 12 and new data signal D2 to transmitter 13 through switch SW4. Transmitter 13 transmits data signals D1-D3 from internal circuit 23 to control circuit 3.3 through communication line L1 of communication cable 4.2. Transmission of data signal from transmitter 14 is stopped.

If abnormality detection signals φ21, φ22 get to the "L" level and the "H" level, respectively, then switch SW3 is turned on and switches SW1, SW2, SW4 are turned off. Internal circuit 23 stops receiving data signals D1, D3 from receiver 12 and supplies data signal D1 from receiver 11 and new data signal D2 to transmitter 14 through switch SW3. Transmitter 14 transmits data signals D1, D2 from internal circuit 23 to control circuit 3.1 through communication line L2 of communication cable 4.1. Transmission of data signal from transmitter 13 is stopped.

If the condition where output signals φ15, φ16 of determination devices 15, 16 are both at the "L" level but where data signal D1 from receiver 11 and data signal D1 from receiver 12 do not match each other occurs three times consecutively, then switch SW3 is turned on and switches SW1, SW2, SW4 are turned off. Internal circuit 23 stops receiving data signals D1, D3 from receiver 12 and supplies data signal D1 from receiver 11 and new data signal D2 to transmitter 14 through switch SW3. Transmitter 14 transmits data signals D1, D2 from internal circuit 23 to control circuit 3.1 through communication line L2 of communication cable 4.1. Transmission of data signal from transmitter 13 is stopped. Internal circuit 23 outputs alarm signal AL2 notifying the occurrence of abnormality in communication of data signal.

If the condition where output signals φ15, φ16 of determination devices 15, 16 are both at the "L" level but where data signal D1 from receiver 11 and data signal D1 from receiver 12 do not match each other occurs three times consecutively, then switch SW4 may be turned on and switches SW1-SW3 may be turned off. Internal circuit 23 stops receiving data signal D1 from receiver 11 and supplies data signals D1, D3 from receiver 12 and new data signal D2 to transmitter 13 through switch SW4. Transmitter 13 transmits data signals D1-D3 from internal circuit 23 to control circuit 3.3 through communication line L1 of communication cable 4.2. Transmission of data signal from transmitter 14 is stopped.

Figure 5:
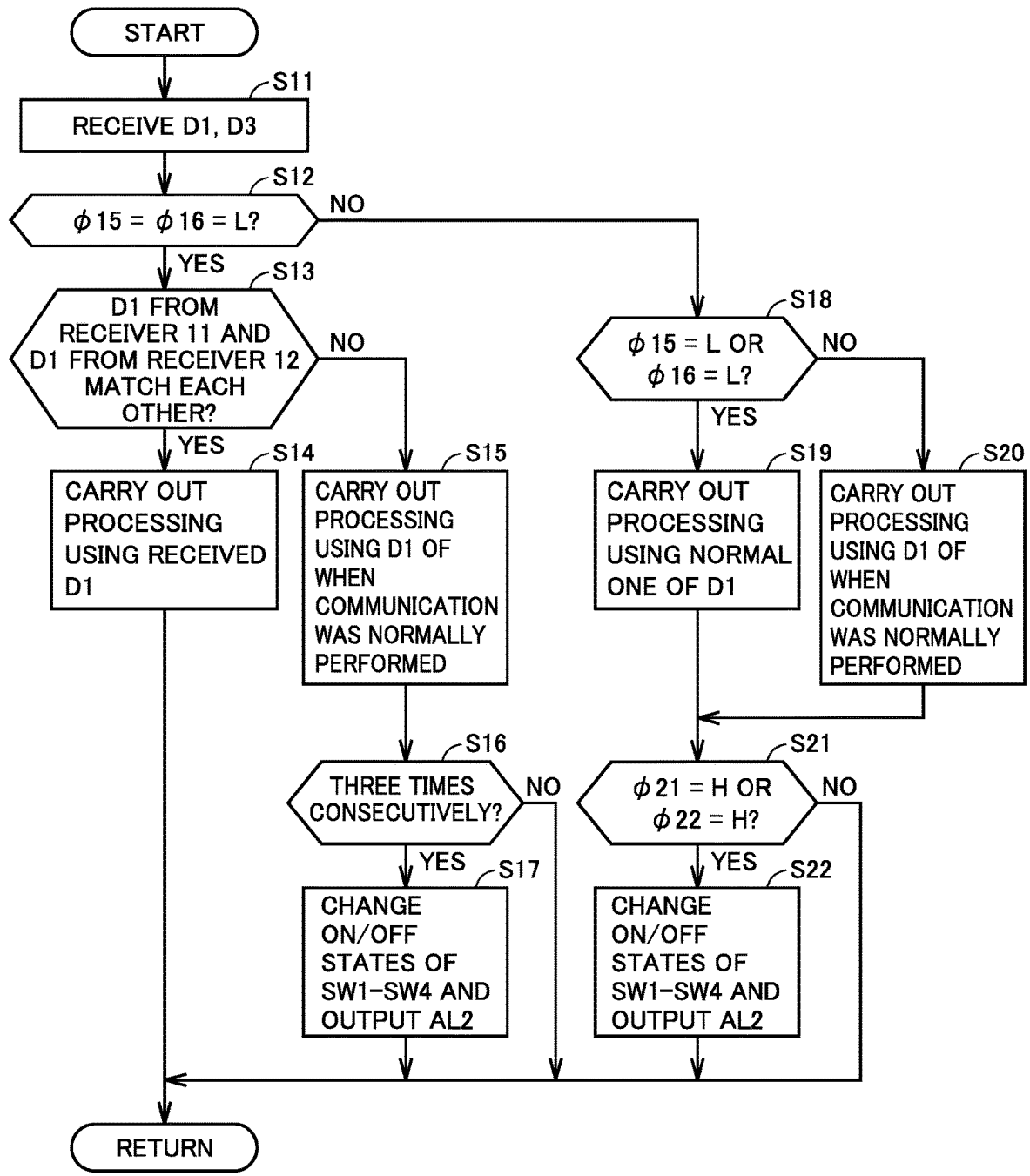
FIG. 5 is a flowchart showing an operation of an internal circuit shown in FIG. 4.

FIG. 5 is a flowchart showing an operation of internal circuit 23. At step S11, internal circuit 23 receives data signals D1, D3 through receivers 11, 12. At step S12, internal circuit 23 determines whether or not output signals φ15, φ16 of determination devices 15, 16 are both at the "L" level.

If signals φ15, φ16 are both at the "L" level at step S12, internal circuit 23 determines at step S13 whether or not data signal D1 from receiver 11 and data signal D1 from receiver 12 match each other.

If it is determined at step S13 that data signals D1 from receivers 11, 12 match each other, internal circuit 23 carries out processing, at step S14, using data signals D1 from receivers 11, 12. That is, internal circuit 23 controls inverter 1.2 based on the received data signal D1 and based on output signal φ2 of current detector 2.2, stores the latest data signal D1, generates new data signal D2 based on signal φ2 to transmit the new data signal D2 to control circuits 3.1, 3.3, and returns to step S11.

If it is determined at step S13 that data signals D1 from receivers 11, 12 do not match each other, internal circuit 23 carries out processing, at step S15, using the latest data signal D1 that was used and stored when data communication was normally performed. That is, internal circuit 23 controls inverter 1.2 based on the latest data signal D1 that was used and stored when data communication was normally performed and based on output signal φ2 of current detector 2.2, and generates new data signal D2 based on signal φ2 to transmit the new data signal D2 to control circuits 3.1, 3.3.

At step S16, internal circuit 23 determines whether or not data signal D1 of the time when data communication was normally performed has been used three times consecutively. If it is determined at step S16 that data signal D1 of the time when data communication was normally performed has been used three times consecutively, then internal circuit 23 changes ON/OFF states of switches SW1-SW4 and outputs alarm signal AL2 at step S17, and returns to step S11. At this time, switch SW3 is turned on and switches SW1, SW2, SW4 are turned off. If the condition where data signal D1 of the time when communication was normally performed has been used three times consecutively is denied at step S16, then the process by internal circuit 23 returns to step S11.

If the condition where signals φ15, φ16 are both at the "L" level is denied at step S12, then internal circuit 23 determines at step S18 whether or not signal φ15 or signal φ16 is at the "L" level.

If it is determined at step S18 that signal φ15 or signal φ16 is at the "L" level, internal circuit 23 carries out processing, at step S19, using a normal one of data signals D1 from receivers 11, 12. That is, internal circuit 23 controls inverter 1.2 based on a normal one of data signals D1 and based on output signal φ2 of current detector 2.2, generates new data signal D2 based on signal φ2 to transmit the new data signal D2 to control circuits 3.1, 3.3, and then goes on to step S21.

If the condition where signal φ15 or signal φ16 is at the "L" level is denied at step S18, then internal circuit 23 carries out processing, at step S20, using the latest data signal D1 that was used and stored when data communication was normally performed. That is, internal circuit 23 controls inverter 1.2 based on the latest data signal D1 that was used and stored when data communication was normally performed and based on output signal φ2 of current detector 2.2, generates new data signal D2 based on signal φ2 to transmit the new data signal D2 to control circuits 3.1, 3.3, and then goes on to step S21.

At step S21, internal circuit 23 determines whether or not abnormality detection signal φ21 or φ22 is at the "H" level. If abnormality detection signal φ21 or φ22 is at the "H" level, then internal circuit 23 changes ON/OFF states of switches SW1-SW4 and outputs alarm signal AL2 at step S22, and returns to step S11. At this time, if abnormality detection signal φ21 is at the "H" level, then switches SW1-SW3 are turned off and switch SW4 is turned on; whereas if abnormality detection signal φ22 is at the "H" level, then switches SW1, SW2, SW4 are turned off and switch SW3 is turned on. If the condition where abnormality detection signal φ21 or φ22 is at the "H" level is denied at step S21, then the process by internal circuit 23 returns to step S11.

Figure 6:
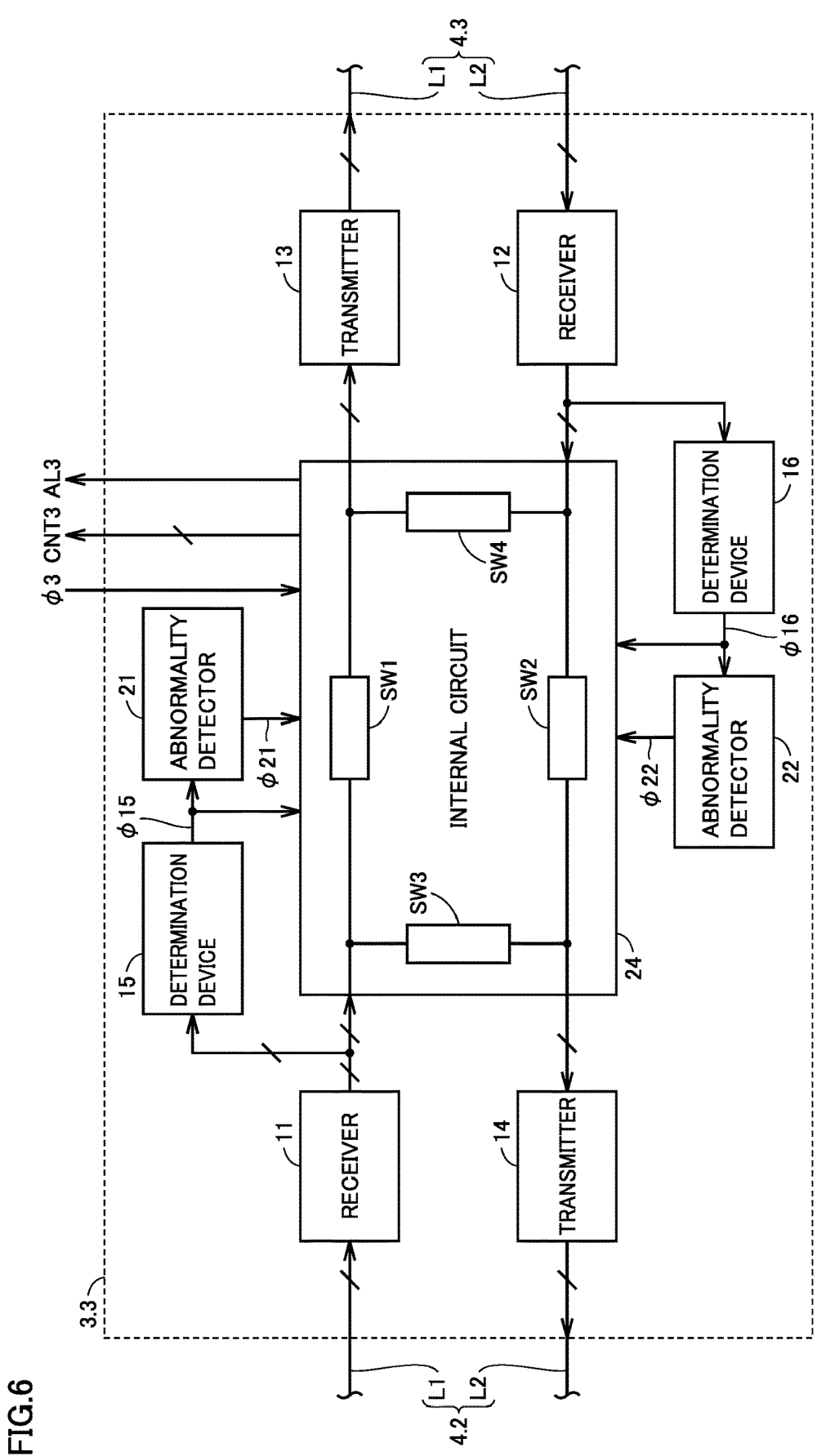
FIG. 6 is a block diagram showing a configuration of a control circuit 3.3 shown in FIG. 1.

FIG. 6 is a block diagram showing a configuration of control circuit 3.3, FIG. 6 being contrasted with FIG. 4. With reference to FIG. 6, control circuit 3.3 is different from control circuit 3.2 in that the former includes an internal circuit 24 instead of internal circuit 23.

Receiver 11 receives data signals D1, D2 transmitted from control circuit 3.2 through communication line L1 of communication cable 4.2, and supplies the received data signals D1, D2 to determination device 15 and internal circuit 24. Determination device 15 determines whether or not data signals D1, D2 from receiver 11 are normal. If the data signals D1, D2 are normal, determination device 15 sets signal φ15 to the "L" level; whereas if the data signals D1, D2 are abnormal, determination device 15 sets signal φ15 to the "H" level. Signal φ15 is supplied to internal circuit 24.

Receiver 12 receives data signal D1 transmitted from control circuit 3.1 through communication line L2 of communication cable 4.3, and supplies the received data signal D1 to determination device 16 and internal circuit 24. Determination device 16 determines whether or not data signal D1 from receiver 12 is normal. If the data signal D1 is normal, determination device 16 sets signal φ16 to the "L" level; whereas if the data signal D1 is abnormal, determination device 16 sets signal φ16 to the "H" level. Signal φ16 is supplied to internal circuit 24. The operation of each of abnormality detectors 21, 22 is as described with reference to FIG. 4.

If determination devices 15, 16 determine data signals D1, D2 and data signal D1 to be normal to set signals φ15, φ16 both to the "L" level, and data signal D1 from receiver 11 and data signal D1 from receiver 12 match each other, then internal circuit 24 calculates cross current IC3 based on the data signal D1 (i.e., sharing current value IS) and based on output signal φ3 (i.e., load current value IL3) of current detector 2.3, generates control signal CNT3 so that the cross current IC3 is 0 A, and controls inverter 1.3. Further, internal circuit 24 generates data signal D3 (i.e., load current value IL3) based on output signal φ3 of current detector 2.3. In the case where data communication has been normally performed as in this case, internal circuit 24 stores the latest data signal D1 that has been used for controlling inverter 1.3.

If determination devices 15, 16 determine data signals D1, D2 and data signal D1 to be normal, and data signal D1 from receiver 11 and data signal D1 from receiver 12 do not match each other, then internal circuit 24 calculates cross current IC3 based on the latest data signal D1 (i.e., sharing current value IS) that was used and stored when data communication was normally performed and based on output signal φ3 (i.e., load current value IL3) of current detector 2.3, generates control signal CNT3 so that the cross current IC3 is 0 A, and controls inverter 1.3. Further, internal circuit 24 generates data signal D3 (i.e., load current value IL3) based on output signal φ3 of current detector 2.3.

If determination device 15 determines data signals D1, D2 from receiver 11 to be normal to set signal φ15 to the "L" level, and determination device 16 determines data signal D1 from receiver 12 to be abnormal to set signal φ16 to the "H" level, then internal circuit 24 calculates cross current IC3 based on data signal D1 (i.e., sharing current value IS) from receiver 11 and based on output signal φ3 (i.e., load current value IL3) of current detector 2.3, generates control signal CNT3 so that the cross current IC3 is 0 A, and controls inverter 1.3. Further, internal circuit 24 generates data signal D3 (i.e., load current value IL3) based on output signal φ3 of current detector 2.3.

If determination device 15 determines data signals D1, D2 from receiver 11 to be abnormal to set signal φ15 to the "H" level, and determination device 16 determines data signal D1 from receiver 12 to be normal to set signal φ16 to the "L" level, then internal circuit 24 calculates cross current IC3 based on data signal D1 (i.e., sharing current value IS) from receiver 12 and based on output signal φ3 (i.e., load current value IL3) of current detector 2.3, generates control signal CNT3 so that the cross current IC3 is 0 A, and controls inverter 1.3. Further, internal circuit 24 generates data signal D3 (i.e., load current value IL3) based on output signal φ3 of current detector 2.3.

If determination devices 15, 16 both determine data signals D1 to be abnormal, then internal circuit 24 calculates cross current IC3 based on the latest data signal D1 (i.e., sharing current IS) that was used and stored when data communication was normally performed and based on output signal φ3 (i.e., load current value IL3) of current detector 2.3, generates control signal CNT3 so that the cross current IC3 is 0 A, and controls inverter 1.3. Further, internal circuit 24 generates data signal D3 (i.e., load current value IL3) based on output signal φ3 of current detector 2.3.

Further, internal circuit 24 includes switches SW1-SW4. Switch SW1 is connected between receiver 11 and transmitter 13. Switch SW2 is connected between receiver 12 and transmitter 14. Switch SW3 is connected between receiver 11 and transmitter 14. Switch SW4 is connected between receiver 12 and transmitter 13.

If abnormality detection signals φ21, φ22 are both at the "L" level (inactivation level), then switches SW1, SW2 are turned on and switches SW3, SW4 are turned off. Internal circuit 24 supplies data signals D1, D2 from receiver 11 and new data signal D3 to transmitter 13 through switch SW1, and supplies data signal D1 from receiver 12 and new data signal D3 to transmitter 14 through switch SW2. Transmitter 13 transmits data signals D1-D3 from internal circuit 24 to control circuit 3.1 through communication line L1 of communication cable 4.3. Transmitter 14 transmits data signals D1, D3 from internal circuit 24 to control circuit 3.2 through communication line L2 of communication cable 4.2.

If abnormality detection signals φ21, φ22 get to the "H" level and the "L" level, respectively, then switch SW4 is turned on and switches SW1-SW3 are turned off. Internal circuit 24 stops receiving data signals D1, D2 from receiver 11, and supplies data signals D1, D3 from receiver 12 and new data signal D2 to transmitter 13 through switch SW4. Transmitter 13 transmits data signals D1-D3 from internal circuit 24 to control circuit 3.1 through communication line L1 of communication cable 4.3. Transmission of data signal from transmitter 14 is stopped.

If abnormality detection signals φ21, φ22 get to the "L" level and the "H" level, respectively, then switch SW3 is turned on and switches SW1, SW2, SW4 are turned off. Internal circuit 24 stops receiving data signal D1 from receiver 12, and supplies data signals D1, D2 from receiver 11 and new data signal D3 to transmitter 14 through switch SW3. Transmitter 14 transmits data signals D1-D3 from internal circuit 24 to control circuit 3.2 through communication line L2 of communication cable 4.2. Transmission of data signal from transmitter 13 is stopped.

If the condition where output signals φ15, φ16 of determination devices 15, 16 are both at the "L" level but where data signal D1 from receiver 11 and data signal D1 from receiver 12 do not match each other occurs three times consecutively, then switch SW3 is turned on and switches SW1, SW2, SW4 are turned off. Internal circuit 24 stops receiving data signal D1 from receiver 12 and supplies data signals D1, D2 from receiver 11 and new data signal D3 to transmitter 14 through switch SW3. Transmitter 14 transmits data signals D1-D3 from internal circuit 24 to control circuit 3.2 through communication line L2 of communication cable 4.2. Transmission of data signal from transmitter 13 is stopped. Internal circuit 24 outputs alarm signal AL3 notifying the occurrence of abnormality in the data signal.

If the condition where output signals φ15, φ16 of determination devices 15, 16 are both at the "L" level but where data signal D1 from receiver 11 and data signal D1 from receiver 12 do not match each other occurs three times consecutively, then switch SW4 may be turned on and switches SW1-SW3 may be turned off. Internal circuit 24 stops receiving data signals D1, D2 from receiver 11, and supplies data signal D1 from receiver 12 and new data signal D3 to transmitter 13 through switch SW4. Transmitter 13 transmits data signals D1, D3 from internal circuit 24 to control circuit 3.1 through communication line L1 of communication cable 4.3. Transmission of data signal from transmitter 14 is stopped.

Figure 7:
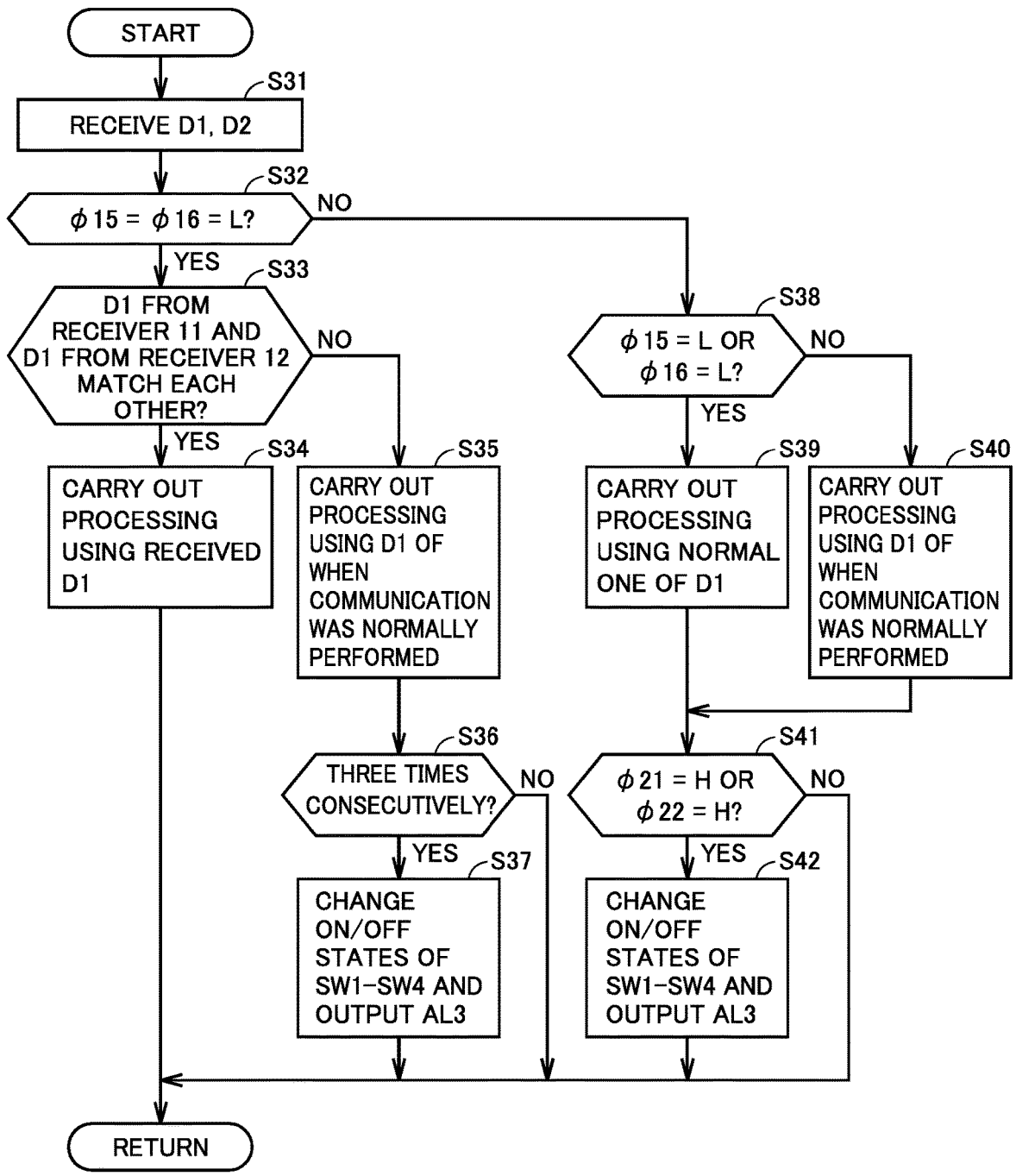
FIG. 7 is a flowchart showing an operation of an internal circuit shown in FIG. 6.

FIG. 7 is a flowchart showing an operation of internal circuit 24. At step S31, internal circuit 24 receives data signals D1, D2 through receivers 11, 12. At step S32, internal circuit 24 determines whether or not output signals φ15, φ16 of determination devices 15, 16 are both at the "L" level.

If signals φ15, φ16 are both at the "L" level at step S32, internal circuit 24 determines at step S33 whether or not data signal D1 from receiver 11 and data signal D1 from receiver 12 match each other.

If it is determined at step S33 that data signals D1 from receivers 11, 12 match each other, internal circuit 24 carries out processing, at step S34, using data signals D1 from receivers 11, 12. That is, internal circuit 24 controls inverter 1.3 based on the received data signal D1 and based on output signal φ3 of current detector 2.3, stores the latest data signal D1, generates new data signal D3 based on signal φ3 to transmit the new data signal D3 to control circuits 3.1, 3.2, and returns to step S31.

If it is determined at step S33 that data signals D1 from receivers 11, 12 do not match each other, internal circuit 24 carries out processing, at step S35, using the latest data signal D1 that was used and stored when data communication was normally performed. That is, internal circuit 24 controls inverter 1.3 based on the latest data signal D1 that was used and stored when data communication was normally performed and based on output signal φ3 of current detector 2.3, generates new data signal D3 based on signal φ3, and transmits the new data signal D3 to control circuits 3.1, 3.2.

At step S36, internal circuit 24 determines whether or not data signal D1 of the time when data communication was normally performed has been used three times consecutively. If it is determined at step S36 that data signal D1 of the time when data communication was normally performed has been used three times consecutively, then internal circuit 24 changes ON/OFF states of switches SW1-SW4 and outputs alarm signal AL3 at step S37, and returns to step S31. At this time, switch SW3 is turned on and switches SW1, SW2, SW4 are turned off. If the condition where data signal D1 of the time when communication was normally performed has been used three times consecutively is denied at step S36, then the process by internal circuit 24 returns to step S31.

If the condition where signals φ15, φ16 are both at the "L" level is denied at step S32, then internal circuit 24 determines at step S38 whether or not signal φ15 or signal φ16 is at the "L" level.

If it is determined at step S38 that signal φ15 or signal φ16 is at the "L" level, internal circuit 24 carries out processing, at step S39, using a normal one of data signals D1 from receivers 11, 12. That is, internal circuit 24 controls inverter 1.3 based on a normal one of data signals D1 and based on output signal φ3 of current detector 2.3, generates new data signal D3 based on signal φ3 to transmit the new data signal D3 to control circuits 3.1, 3.2, and goes on to step S41.

If the condition where signal φ15 or signal φ16 is at the "L" level is denied at step S38, then internal circuit 24 carries out processing, at step S40, using the latest data signal D1 that was used and stored when communication was normally performed. That is, internal circuit 24 controls inverter 1.3 based on the latest data signal D1 that was used and stored when data communication was normally performed and based on output signal φ3 of current detector 2.3, generates new data signal D3 based on signal φ3 to transmit the new data signal D3 to control circuits 3.1, 3.2, and goes on to step S41.

At step S41, internal circuit 24 determines whether or not abnormality detection signal φ21 or φ22 is at the "H" level. If abnormality detection signal φ21 or φ22 is at the "H" level, then internal circuit 24 changes ON/OFF states of switches SW1-SW4 and outputs alarm signal AL3 at step S42, and returns to step S31. At this time, if abnormality detection signal φ21 is at the "H" level, then switches SW1-SW3 are turned off and switch SW4 is turned on; whereas if abnormality detection signal φ22 is at the "H" level, then switches SW1, SW2, SW4 are turned off and switch SW3 is turned on. If the condition where abnormality detection signal φ21 or φ22 is at the "H" level is denied at step S41, then the process by internal circuit 24 returns to step S31.

Figure 8:
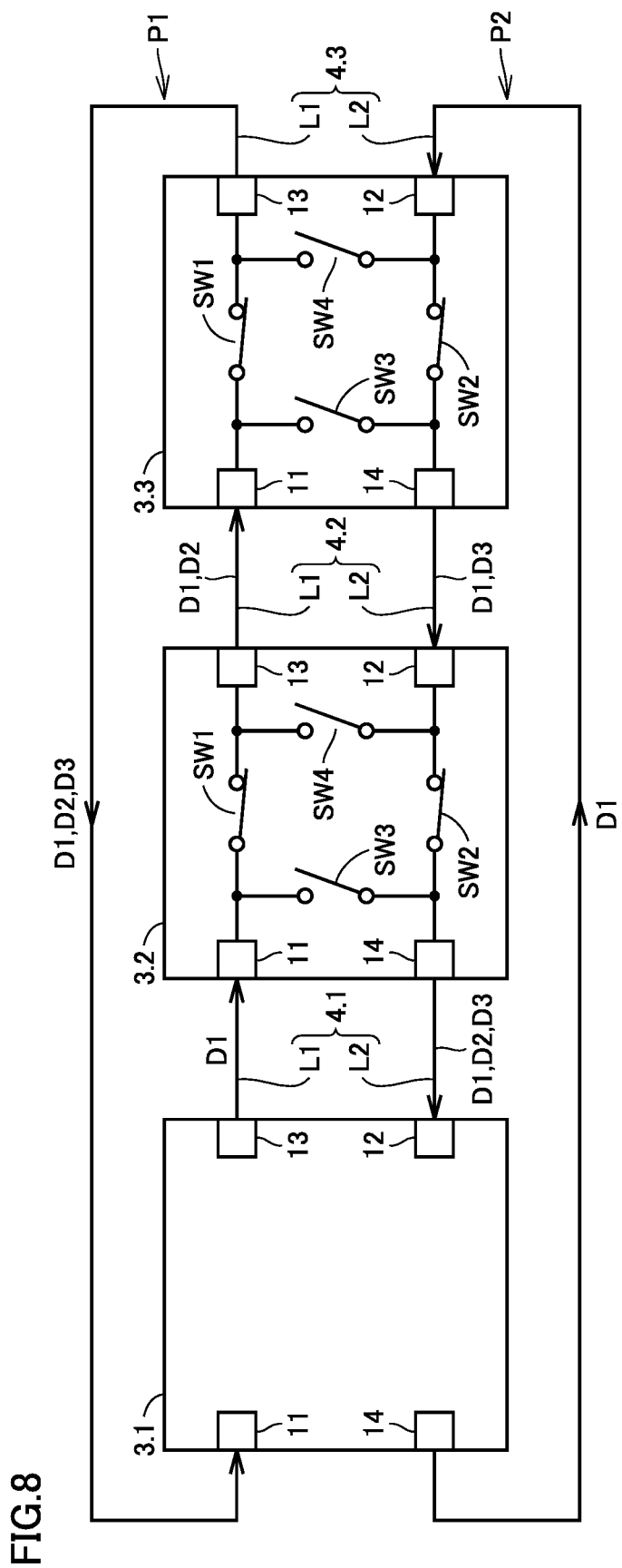
FIG. 8 is a circuit block diagram showing communication paths with control circuits 3.1-3.3 shown in FIG. 1.

FIG. 8 is a circuit block diagram showing communication paths when data communication is being normally performed between control circuits 3.1 and 3.2, between control circuits 3.2 and 3.3, and between control circuits 3.3 and 3.1. In FIG. 8, in each of control circuits 3.2, 3.3, switches SW1, SW2 are ON and switches SW3, SW4 are OFF. Control circuits 3.1-3.3 and communication lines L1 of communication cables 4.1-4.3 form a first communication path P1, and control circuits 3.1-3.3 and communication lines L2 of communication cables 4.1-4.3 form a second communication path P2.

In first communication path P1, data signal D1 generated in control circuit 3.1 is transmitted to receiver 11 of control circuit 3.2 through transmitter 13 and communication line L1 of communication cable 4.1. Data signal D1 received by receiver 11 of control circuit 3.2 and data signal D2 generated in control circuit 3.2 are transmitted to receiver 11 of control circuit 3.3 through switch SW1, transmitter 13, and communication line L1 of communication cable 4.2. Data signals D1, D2 received by receiver 11 of control circuit 3.3 and data signal D3 generated in control circuit 3.3 are transmitted to receiver 11 of control circuit 3.1 through switch SW1, transmitter 13, and communication line L1 of communication cable 4.3.

In second communication path P2, data signal D1 generated in control circuit 3.1 is transmitted to receiver 12 of control circuit 3.3 through transmitter 14 and communication line L2 of communication cable 4.3. Data signal D1 received by receiver 12 of control circuit 3.3 and data signal D3 generated in control circuit 3.3 are transmitted to receiver 12 of control circuit 3.2 through switch SW2, transmitter 14, and communication line L2 of communication cable 4.2. Data signals D1, D3 received by receiver 12 of control circuit 3.2 and data signal D2 generated in control circuit 3.2 are transmitted to receiver 12 of control circuit 3.1 through switch SW2, transmitter 14, and communication line L2 of communication cable 4.1. Control circuit 3.1 generates new data signal D1 based on data signals D2, D3 received by receivers 11, 12.

Figure 9:
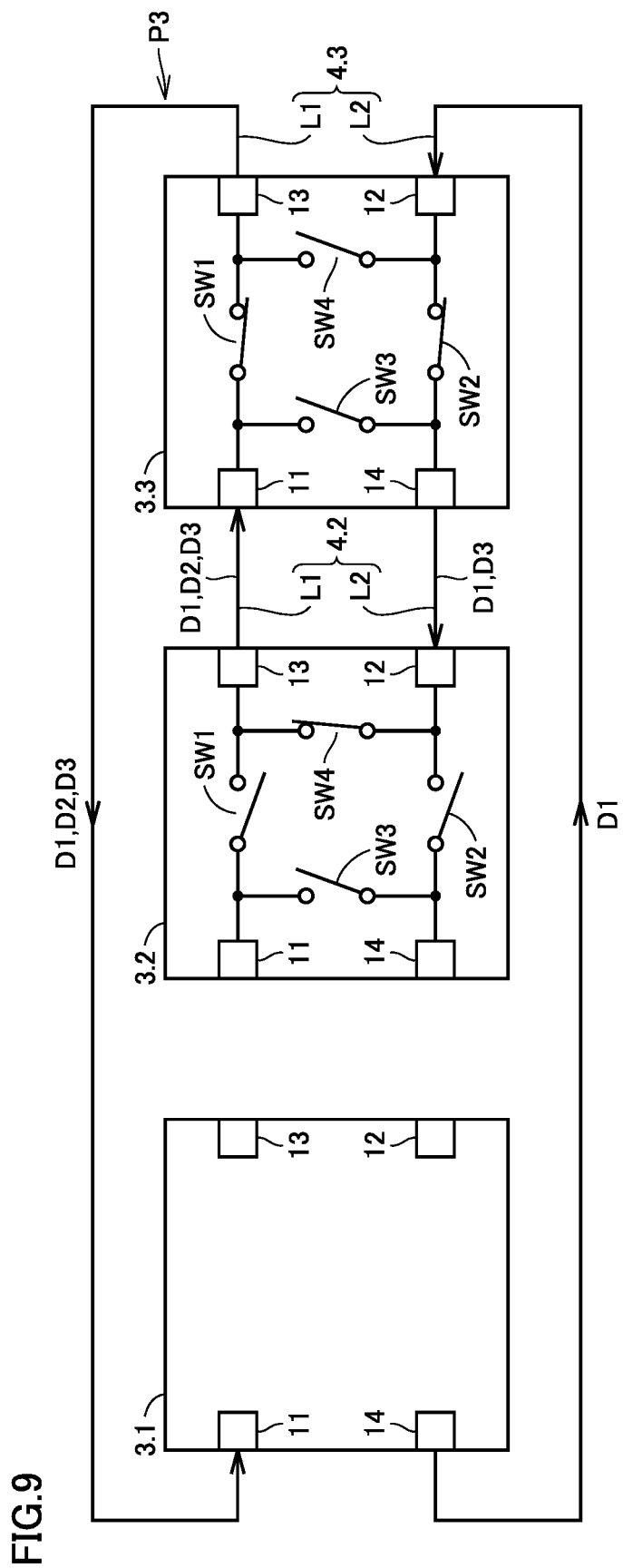
FIG. 9 is a circuit block diagram showing another communication path with control circuits 3.1-3.3 shown in FIG. 1.

FIG. 9 is a circuit block diagram showing a communication path when data communication is abnormal between control circuits 3.1 and 3.2. Such a situation occurs, for example, when a contact failure occurs between one connector of communication cable 4.1 and a connector of control circuit 3.1, when a contact failure occurs between the other connector of communication cable 4.1 and a connector of control circuit 3.2, when receiver 12 and transmitter 13 of control circuit 3.1 are broken, when receiver 11 and transmitter 14 of control circuit 3.2 are broken, and the like.

In FIG. 9, in control circuit 3.2, switches SW1-SW3 are OFF and switch SW4 is ON. In control circuit 3.3, switches SW1, SW2 are ON and switches SW3, SW4 are OFF. Control circuits 3.1-3.3 and communication lines L1, L2 of communication cables 4.2, 4.3 form a third communication path P3.

In third communication path P3, data signal D1 generated in control circuit 3.1 is transmitted to receiver 12 of control circuit 3.3 through transmitter 14 and communication line L2 of communication cable 4.3. Data signal D1 received by receiver 12 of control circuit 3.3 and data signal D3 generated in control circuit 3.3 are transmitted to receiver 12 of control circuit 3.2 through switch SW2, transmitter 14, and communication line L2 of communication cable 4.2.

Data signals D1, D3 received by receiver 12 of control circuit 3.2 and data signal D2 generated in control circuit 3.2 are transmitted to receiver 11 of control circuit 3.3 through switch SW4, transmitter 13, and communication line L1 of communication cable 4.2. Data signals D1, D2 received by receiver 11 of control circuit 3.3 and data signal D3 generated in control circuit 3.3 are transmitted to receiver 11 of control circuit 3.1 through switch SW1, transmitter 13, and communication line L1 of communication cable 4.3. Control circuit 3.1 generates new data signal D1 based on data signals D2, D3 received by receiver 11.

In this case, alarm signal AL2 is output from control circuit 3.2 and alarm signal AL3 is not output from control circuit 3.3, showing an abnormality in data communication between control circuits 3.1 and 3.2. Therefore, by overcoming the contact failure between a connector of communication cable 4.1 and a connector of control circuit 3.1 or 3.2, for example, the data communication between control circuits 3.1 and 3.2 can be restored to a normal state.

Figure 10:
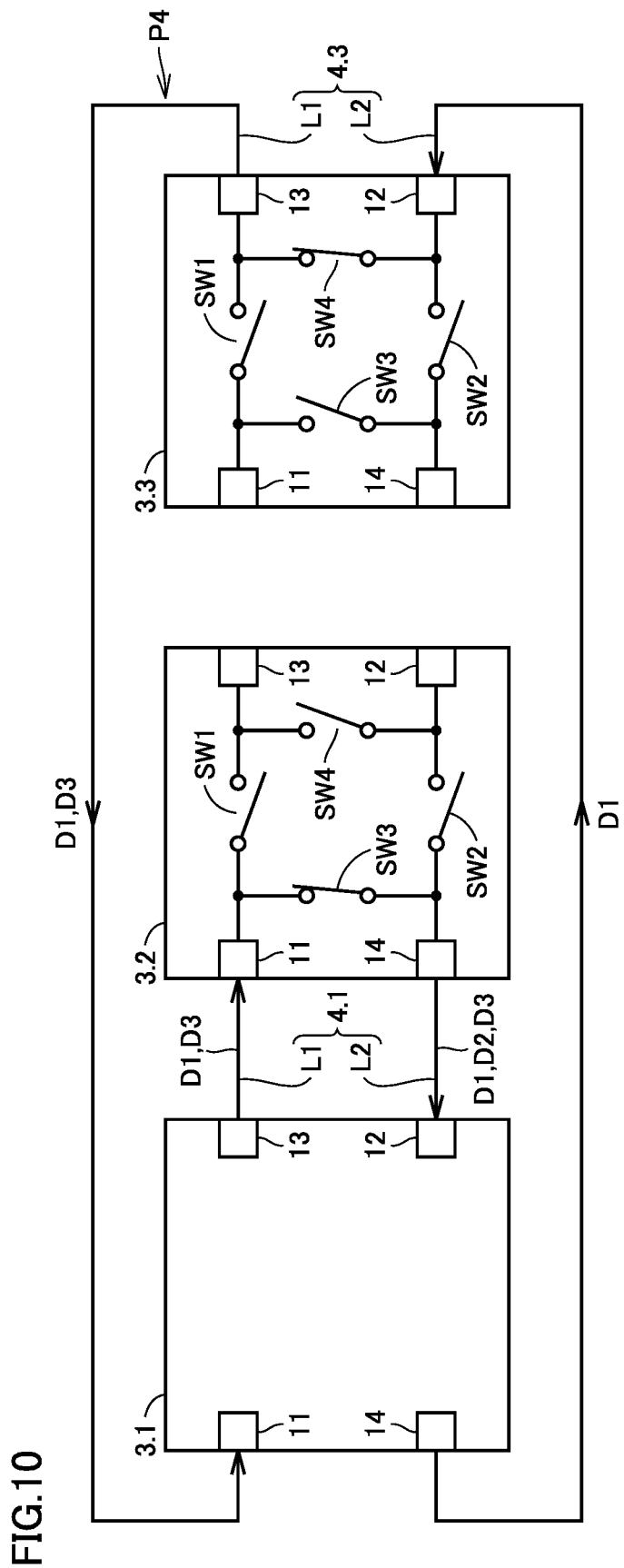
FIG. 10 is a circuit block diagram showing still another communication path with control circuits 3.1-3.3 shown in FIG. 1.

FIG. 10 is a circuit block diagram showing a communication path when data communication is abnormal between control circuits 3.2 and 3.3. Such a situation occurs, for example, when a contact failure occurs between one connector of communication cable 4.2 and a connector of control circuit 3.2, when a contact failure occurs between the other connector of communication cable 4.2 and a connector of control circuit 3.3, when receiver 12 and transmitter 13 of control circuit 3.2 are broken, when receiver 11 and transmitter 14 of control circuit 3.3 are broken, and the like.

In FIG. 10, in control circuit 3.2, switches SW1, SW2, SW4 are OFF and switch SW3 is ON. In control circuit 3.3, switches SW1-SW3 are OFF and switch SW4 is ON. Control circuits 3.1-3.3 and communication lines L1, L2 of communication cables 4.1, 4.3 form a fourth communication path P4.

In fourth communication path P4, data signal D1 generated in control circuit 3.1 is transmitted to receiver 12 of control circuit 3.3 through transmitter 14 and communication line L2 of communication cable 4.3. Data signal D1 received by receiver 12 of control circuit 3.3 and data signal D3 generated in control circuit 3.3 are transmitted to receiver 11 of control circuit 3.1 through switch SW4, transmitter 13, and communication line L1 of communication cable 4.3.

Data signals D1, D3 received by receiver 11 of control circuit 3.1 are transmitted to receiver 11 of control circuit 3.2 through transmitter 13 and communication line L1 of communication cable 4.1. Data signals D1, D3 received by receiver 11 of control circuit 3.2 and data signal D2 generated in control circuit 3.2 are transmitted to receiver 12 of control circuit 3.1 through switch SW3, transmitter 14, and communication line L2 of communication cable 4.1. Control circuit 3.1 generates new data signal D1 based on data signals D2, D3 received by receiver 12.

In this case, alarm signals AL2, AL3 are output from control circuits 3.2, 3.3, showing an abnormality in data communication between control circuits 3.2 and 3.3. Therefore, by overcoming the contact failure between a connector of communication cable 4.2 and a connector of control circuit 3.2 or 3.3, for example, the data communication between control circuits 3.2 and 3.3 can be restored to a normal state.

Figure 11:
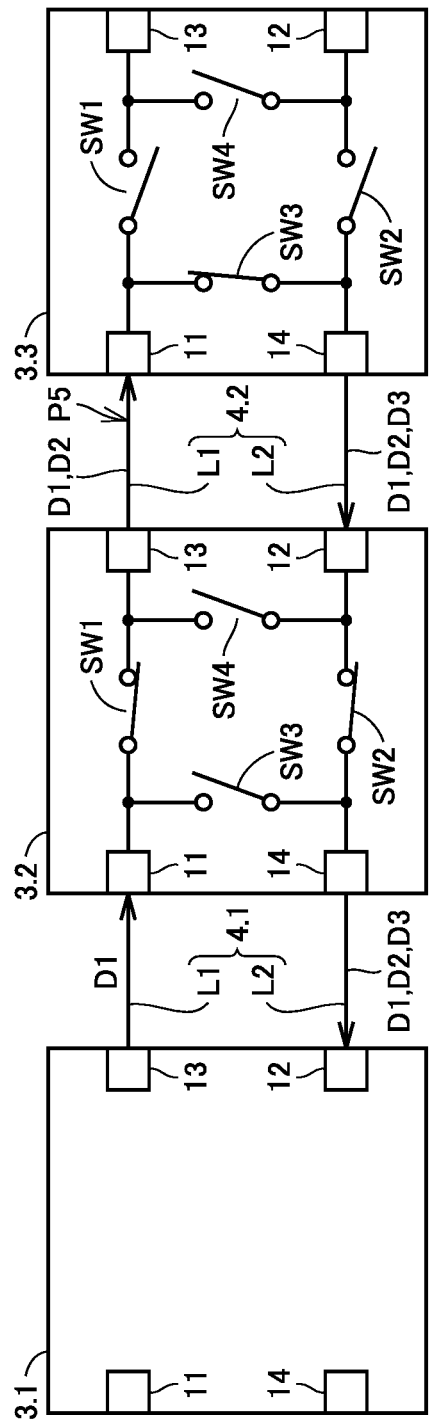
FIG. 11 is a circuit block diagram showing still another communication path with control circuits 3.1-3.3 shown in FIG. 1.

FIG. 11 is a circuit block diagram showing a communication path when data communication is abnormal between control circuits 3.3 and 3.1. Such a situation occurs, for example, when a contact failure occurs between one connector of communication cable 4.3 and a connector of control circuit 3.3, when a contact failure occurs between the other connector of communication cable 4.3 and a connector of control circuit 3.1, when receiver 12 and transmitter 13 of control circuit 3.3 are broken, when receiver 11 and transmitter 14 of control circuit 3.1 are broken, and the like.

In FIG. 11, in control circuit 3.2, switches SW3, SW4 are OFF and switches SW1, SW2 are ON. In control circuit 3.3, switches SW1, SW2, SW4 are OFF and switch SW3 is ON. Control circuits 3.1-3.3 and communication lines L1, L2 of communication cables 4.1, 4.2 form a fifth communication path P5.

In fifth communication path P5, data signal D1 generated in control circuit 3.1 is transmitted to receiver 11 of control circuit 3.2 through transmitter 13 and communication line L1 of communication cable 4.1. Data signal D1 received by receiver 11 of control circuit 3.2 and data signal D2 generated in control circuit 3.2 are transmitted to receiver 11 of control circuit 3.3 through switch SW1, transmitter 13, and communication line L1 of communication cable 4.2.

Data signals D1, D2 received by receiver 11 of control circuit 3.3 and data signal D3 generated in control circuit 3.3 are transmitted to receiver 12 of control circuit 3.2 through switch SW3, transmitter 14, and communication line L2 of communication cable 4.2. Data signals D1, D3 received by receiver 12 of control circuit 3.2 and data signal D2 generated in control circuit 3.2 are transmitted to receiver 12 of control circuit 3.1 through switch SW2, transmitter 14, and communication line L2 of communication cable 4.1. Control circuit 3.1 generates new data signal D1 based on data signals D2, D3 received by receiver 12.

In this case, alarm signal AL2 is not output from control circuit 3.2 and alarm signal AL3 is output from control circuit 3.3, showing an abnormality in data communication between control circuits 3.3 and 3.1. Therefore, by overcoming the contact failure between a connector of communication cable 4.3 and a connector of control circuit 3.3 or 3.1, for example, the data communication between control circuits 3.3 and 3.1 can be restored to a normal state.

As described above, in the present embodiment, control circuits 3.1-3.3 are connected by communication cables 4.1-4.3 to form a ring, with control circuit 3.1 being a master, and with each of control circuits 3.2, 3.3 being a slave. Therefore, reduction in data communication traffic and increase in communication rate can be achieved.

Further, if data communication between control circuits 3.1-3.3 is normal, then ring-shaped first communication path P1 is formed by control circuits 3.1-3.3 and communication lines L1 of communication cables 4.1-4.3, and ring-shaped second communication path P2 is formed by control circuits 3.1-3.3 and communication lines L2 of communication cables 4.1-4.3. For example, if data communication between control circuits 3.1, 3.2 is abnormal, ring-shaped third communication path P3 is formed by communication lines L1, L2 of communication cables 4.2, 4.3 and control circuits 3.1-3.3. Therefore, inverters 1.1-1.3 can be controlled even if an abnormality occurs in data communication between two control circuits.

The case where the present invention is applied to a power conversion system including three control circuits 3.1-3.3 has been described in the present embodiment. The present invention, however, is not limited to such a case. The present invention can be applied to a power conversion system including N control circuits where N is an integer greater than or equal to 2. In the above embodiment, the case of N=3 is described.

The embodiment disclosed here should be considered illustrative in all respects, not limitative. It is intended that the scope of the present invention is defined not by the above description but by the claims, and that the scope of the present invention includes all the modifications in the meaning and scope equivalent to the claims.

REFERENCE SIGNS LIST 1.1-1.3: inverter; 2.1-2.3: current detector; 3.1-3.3: control circuit; 4.1-4.3: communication cable; L1, L2: communication line; 5.1-5.3: DC power source; 6: load; 11, 12: receiver; 13, 14: transmitter; 15, 16: determination device; 17, 23, 24: internal circuit; SW1-SW4: switch; 21, 22: abnormality detector

The invention claimed is:
1. A control system comprising:
n=1 to n=N control circuits configured to control n=1 to n=N electrical apparatuses, respectively; and
n=1 to n=N communication cables each including first and second communication lines, N being an integer greater than or equal to 3, wherein
the n=1 to n=N−1 control circuits are connected to the n=2 to n=N control circuits in respective subsequent stages through the n=1 to n=N−1 communication cables, respectively, the n=N control circuit being connected to the n=1 control circuit in a subsequent stage through the n=N communication cable,
the n=1 control circuit is configured to:
generate an n=1 data signal for controlling the n=1 to n=N electrical apparatuses,
control the n=1 electrical apparatus based on the n=1 data signal,
transmit the n=1 data signal to the n=2 control circuit in a subsequent stage through the first communication line of the n=1 communication cable, and
transmit the n=1 data signal to the n=N control circuit in a preceding stage through the second communication line of the n=N communication cable,
taking n=2 to n=N control circuits as i=1 to i=N control circuits, the control circuit in a preceding stage of an ith control circuit is the (i−1)th control circuit or the n=1 control circuit, and the control circuit in a subsequent stage of the ith control circuit is the (i+1)th control circuit or the n=1 control circuit,
the ith control circuit is configured to:
receive the n=1 data signal,
control an ith electrical apparatus based on the n=1 data signal and generate an ith data signal representing a result of control of the ith electrical apparatus,
if communication of data with each of the control circuits in the preceding stage and in the subsequent stage is normally performed, transmit the ith data signal and a data signal from the control circuit in the preceding stage to the control circuit in the subsequent stage through the first communication line of the ith communication cable, and transmit the ith data signal and a data signal from the control circuit in the subsequent stage to the control circuit in the preceding stage through the second communication line of the (i−1)th communication cable or the second communication line of the n=1 communication cable,
if the communication of data with the control circuit in the preceding stage is not normally performed, stop the communication of data with the control circuit in the preceding stage, and transmit the ith data signal and the data signal from the control circuit in the subsequent stage to the control circuit in the subsequent stage through the first communication line of the ith communication cable, and
if the communication of data with the control circuit in the subsequent stage is not normally performed, stop the communication of data with the control circuit in the subsequent stage, and transmit the ith data signal and the data signal from the control circuit in the preceding stage to the control circuit in the preceding stage through the second communication line of the (i−1)th communication cable or the second communication line of the n=1 communication cable,
the ith control circuit includes:
a first determination device configured to determine whether or not the data signal from the control circuit in the preceding stage is normal;
a second determination device configured to determine whether or not the data signal from the control circuit in the subsequent stage is normal;
a first abnormality detector configured to output a first abnormality detection signal if the first determination device determines the data signal to be abnormal a predetermined number of times consecutively;
a second abnormality detector configured to output a second abnormality detection signal if the second determination device determines the data signal to be abnormal the predetermined number of times consecutively; and
an internal circuit configured to control the ith electrical apparatus based on the n=1 data signal, generate the ith data signal representing the result of control of the ith electrical apparatus, and transmit data signals in accordance with the first and second abnormality detection signals, and
the internal circuit is configured to:
if the first and second abnormality detection signals are not output from the first and second abnormality detectors, respectively, transmit the ith data signal and the data signal from the control circuit in the preceding stage to the control circuit in the subsequent stage through the first communication line of the ith communication cable, and transmit the ith data signal and the data signal from the control circuit in the subsequent stage to the control circuit in the preceding stage through the second communication line of the (i−1)th communication cable or the second communication line of the n=1 communication cable, if the first abnormality detection signal is output from the first abnormality detector, stop receiving the data signal from the control circuit in the preceding stage, and transmit the ith data signal and the data signal from the control circuit in the subsequent stage to the control circuit in the subsequent stage through the first communication line of the ith communication cable, and if the second abnormality detection signal is output from the second abnormality detector, stop receiving the data signal from the control circuit in the subsequent stage, and transmit the ith data signal and the data signal from the control circuit in the preceding stage to the control circuit in the preceding stage through the second communication line of the (i−1)th communication cable or the second communication line of the n=1 communication cable.

2. The control system according to claim 1, wherein the internal circuit is configured to output an alarm signal for notifying an occurrence of an abnormality in the communication of data if the first abnormality detection signal is output from the first abnormality detector or if the second abnormality detection signal is output from the second abnormality detector.

3. The control system according to claim 1, wherein the internal circuit is configured to:

in a first case where each of the first and second determination devices determines the data signal to be normal, control the ith electrical apparatus based on the n=1 data signal included in the data signal from the control circuit in the preceding stage and based on the n=1 data signal included in the data signal from the control circuit in the subsequent stage, in a second case where the first determination device determines the signal from the control circuit in the preceding stage to be normal and where the second determination device determines the data signal from the control circuit in the subsequent stage to be abnormal, control the ith electrical apparatus based on the n=1 data signal included in the data signal from the control circuit in the preceding stage, and in a third case where the first determination device determines the data signal from the control circuit in the preceding stage to be abnormal and where the second determination device determines the data signal from the control circuit in the subsequent stage to be normal, control the ith electrical apparatus based on the n=1 data signal included in the data signal from the control circuit in the subsequent stage.

4. The control system according to claim 3, wherein the first case includes:

a fourth case where the n=1 data signal included in the data signal from the control circuit in the preceding stage and the n=1 data signal included in the data signal from the control circuit in the subsequent stage match each other; and a fifth case where the n=1 data signal included in the data signal from the control circuit in the preceding stage and the n=1 data signal included in the data signal from the control circuit in the subsequent stage do not match each other, and the internal circuit is configured to:

in the fourth case, control the ith electrical apparatus based on the n=1 data signal included in the data signal from the control circuit in the preceding stage and based on the n=1 data signal included in the data signal from the control circuit in the subsequent stage, and store a latest n=1 data signal that has been used for controlling the ith electrical apparatus, and in the fifth case, control the ith electrical apparatus based on the latest n=1 data signal stored in the fourth case.

5. The control system according to claim 4, wherein the internal circuit is configured to, if the fifth case occurs a predetermined number of times consecutively, either transmit the ith data signal and the data signal from the control circuit in the subsequent stage to the control circuit in the subsequent stage through the first communication line of the ith communication cable, or transmit the ith data signal and the data signal from the control circuit in the preceding stage to the control circuit in the preceding stage through the second communication line of the (i−1)th communication cable or the second communication line of the n=1 communication cable.

6. The control system according to claim 5, wherein the internal circuit is configured to, if the fifth case occurs the predetermined number of times consecutively, output an alarm signal for notifying an occurrence of an abnormality in the communication of data.

7. The control system according to claim 1, wherein the n=1 control circuit includes:

an n=1 first determination device configured to determine whether or not a data signal from the n=N control circuit is normal;

an n=1 second determination device configured to determine whether or not a data signal from the n=2 control circuit is normal; and an n=1 internal circuit configured to generate the n=1 data signal based on a result of determination by the n=1 first and second determination devices and based on data signals from the n=N and n=2 control circuits, control the n=1 electrical apparatus based on the generated n=1 data signal, and transmit the generated n=1 data signal to the n=2 second and n=N control circuits, and the n=1 internal circuit is configured to:

in a first case where each of the n=1 first and second determination devices determines the data signal to be normal, generate the n=1 data signal based on n=2 to n=N data signals from the n=2 to n=N control circuits included in data signals from the n=N and n=2 control circuits, in a second case where the n=1 first determination device determines the data signal to be normal and where the n=1 second determination device determines the data signal to be abnormal, generate the n=1 data signal based on the n=2 to n=N data signals from the n=2 to n=N control circuits included in data signals from the n=N control circuit, and in a third case where the n=1 first determination device determines the data signal to be abnormal and where the n=1 second determination device determines the data signal to be normal, generate the n=1 data signal based on the n=2 to n=N data signals from the n=2 to n=N control circuits included in data signals from the n=2 control circuit.

8. The control system according to claim 7, wherein the first case includes:
- a fourth case where the n=2 to n=N data signals from the n=2 to n=N control circuits included in the data signals from the n=N control circuit and the n=2 to n=N data signals from the n=2 to n=N control circuits included in the data signals from the n=2 control circuit match each other; and
- a fifth case where the n=2 to n=N data signals from the n=2 to n=N control circuits included in the data signals from the n=N control circuit and the n=2 to n=N data signals from the n=2 to n=N control circuits included in the data signals from the n=2 control circuit do not match each other, and the internal circuit is configured to:
- in the fourth case, generate the n=1 data signal based on the n=2 to n=N data signals from the n=2 to n=N control circuits included in the data signals from the n=N and n=2 control circuits, and store the latest n=2 to n=N data signals that have been used for generating the n=1 data signal, and
- in the fifth case, generate the n=1 data signal based on the latest n=2 to n=N data signals stored in the fourth case.

9. The control system according to claim 1, wherein the n=1 to n=N electrical apparatuses are n=1 to n=N inverters, respectively, the n=1 to n=N inverters are connected in parallel to a load, each of the n=1 to n=N inverters is configured to convert a DC voltage into an AC voltage and supply the AC voltage to the load, the n=1 data signal represents a sharing current of each of the n=1 to n=N inverters, the ith data signal represents a load current of the ith inverter, the n=1 control circuit is configured to control the n=1 inverter so that a cross current is 0 A, the cross current being a difference between a load current of the n=1 inverter and the sharing current, and the ith control circuit is configured to control the ith inverter so that a cross current is 0 A, the cross current being a difference between a load current of the ith inverter and the sharing current.

* * * * *